(12) United States Patent
Podradchik et al.

(10) Patent No.: US 10,846,533 B2
(45) Date of Patent: Nov. 24, 2020

(54) SYSTEMS AND METHODS FOR AUGMENTED REALITY AVIATION INTERFACES

(71) Applicants: Steven T. Podradchik, Mercer Island, WA (US); John Rutter, III, Woodinville, WA (US); Sean T. Lamont, Shoreline, WA (US)

(72) Inventors: Steven T. Podradchik, Mercer Island, WA (US); John Rutter, III, Woodinville, WA (US); Sean T. Lamont, Shoreline, WA (US)

(73) Assignee: Seattle Avionics, Inc., Woodinville, WA (US)

( * ) Notice: Subject to any disclaimer, the term of this patent is extended or adjusted under 35 U.S.C. 154(b) by 0 days.

(21) Appl. No.: 15/937,793

(22) Filed: Mar. 27, 2018

(65) Prior Publication Data

US 2018/0276475 A1    Sep. 27, 2018

Related U.S. Application Data

(60) Provisional application No. 62/477,240, filed on Mar. 27, 2017.

(51) Int. Cl.
*G06K 9/00* (2006.01)
*G06K 9/32* (2006.01)
*G08G 5/00* (2006.01)
*G08G 5/04* (2006.01)

(52) U.S. Cl.
CPC ....... *G06K 9/00671* (2013.01); *G06K 9/0063* (2013.01); *G06K 9/3208* (2013.01); *G08G 5/0021* (2013.01); *G08G 5/0052* (2013.01); *G08G 5/0078* (2013.01); *G08G 5/045* (2013.01)

(58) Field of Classification Search
None
See application file for complete search history.

(56) References Cited

U.S. PATENT DOCUMENTS

| 6,500,008 | B1* | 12/2002 | Ebersole | A62C 99/0081 345/441 |
| 6,811,330 | B1* | 11/2004 | Tozawa | B60R 11/04 224/321 |
| 9,129,429 | B2 | 9/2015 | Hammond | |
| 10,037,704 | B1* | 7/2018 | Myr | G08G 5/0043 |
| 10,126,913 | B1* | 11/2018 | Ho | G01C 21/3635 |
| 2013/0176453 | A1* | 7/2013 | Mate | H04N 5/2355 348/222.1 |
| 2014/0022281 | A1 | 1/2014 | Georgeson et al. | |

(Continued)

FOREIGN PATENT DOCUMENTS

EP    2819100    12/2014

*Primary Examiner* — Yanna Wu
(74) *Attorney, Agent, or Firm* — Stoel Rives LLP

(57) ABSTRACT

An augmented reality (AR) system for aviation generates aviation objects over an image during flight. The AR system may determine a location and an orientation of the image capture device based on the location information and orientation information. The AR system may determine a field of view of the image capture device and identify aviation objects within the field of view. The AR system can then generate graphical user interface elements for identified aviation objects to be overlayed on the image data.

19 Claims, 16 Drawing Sheets

(56) References Cited

U.S. PATENT DOCUMENTS

| | | | | |
|---|---|---|---|---|
| 2014/0088800 A1* | 3/2014 | Mercer | ............... | B64D 43/02 |
| | | | | 701/14 |
| 2014/0340481 A1* | 11/2014 | Tillotson | ............... | H04N 7/18 |
| | | | | 348/46 |
| 2015/0356873 A1* | 12/2015 | Kneuper | ............ | G08G 5/0052 |
| | | | | 701/439 |
| 2017/0140657 A1* | 5/2017 | Elston | ................ | G06T 11/00 |
| 2017/0291711 A1* | 10/2017 | Litwinowicz | ......... | B64D 25/00 |

* cited by examiner

SYSTEMS AND METHODS FOR AUGMENTED REALITY AVIATION INTERFACES

CROSS REFERENCE TO RELATED APPLICATIONS

The Application Data Sheet (ADS) filed herewith is incorporated by reference. Any applications claimed on the ADS for priority under 35 U.S.C. § 119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent with this disclosure. This application claims the benefit of U.S. Provisional Patent Application No. 62/477,240, which was filed on Mar. 27, 2017, and which is incorporated by reference, to the extent such subject matter is not inconsistent herewith.

TECHNICAL FIELD

The disclosure relates to apparatuses, systems, and methods for overlaying aviation information on a video or image and/or producing augmented reality (AR) display interfaces.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments, and/or changes may be made to the disclosed embodiments, without departing from the scope of the disclosure.

DETAILED DESCRIPTION

Figure 1:
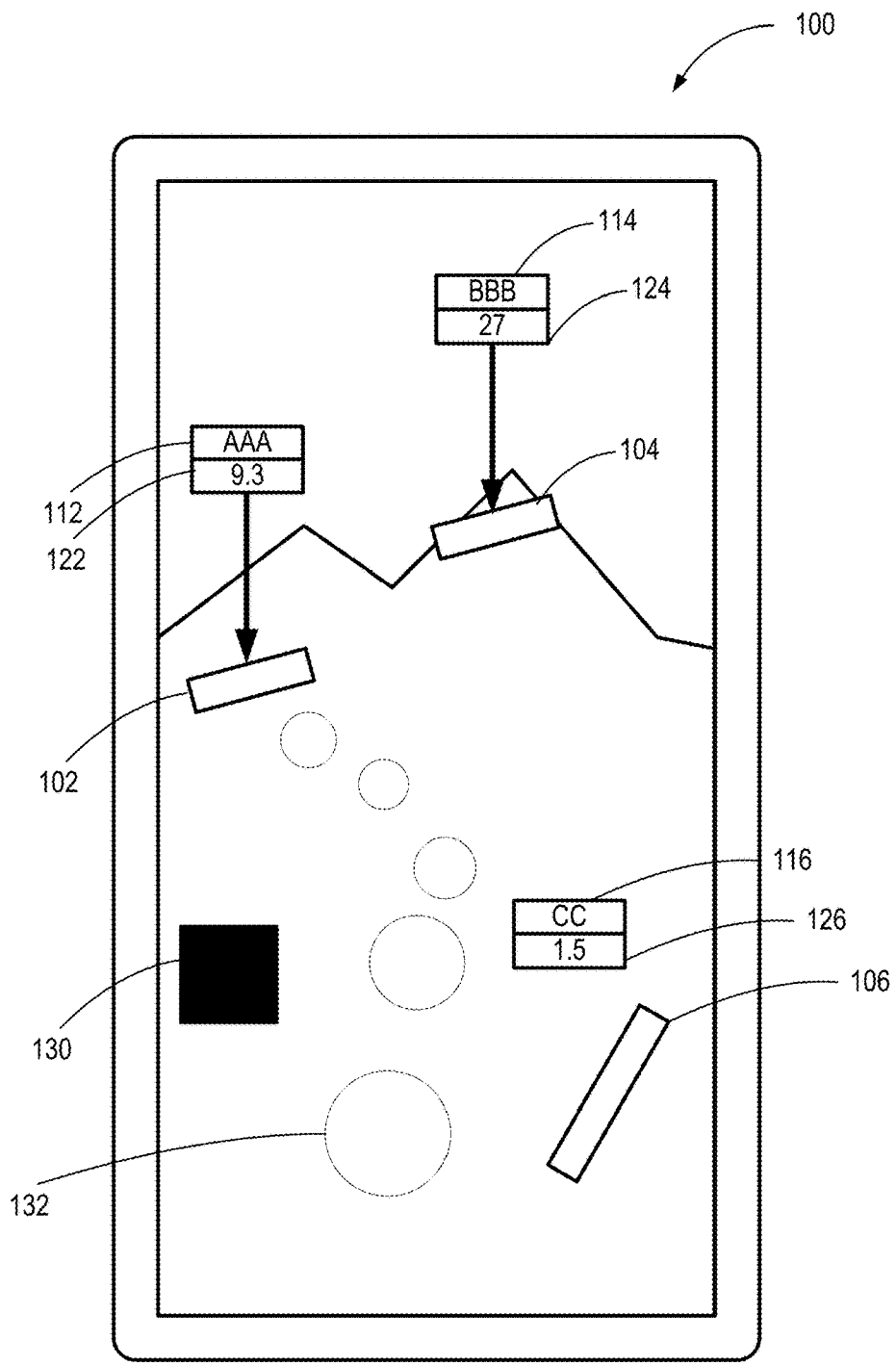
FIG. 1 illustrates an image capture device (e.g., smartphone, tablet, or camera) using embodiments described herein to produce an AR image.

Aviation requires knowing the location of airports and other aviation markers. Many accidents and other incidents are caused by pilots failing to locate or identify airports due to poor visibility, pilot inexperience, or other factors. Global positioning systems (GPS) and other fundamentally two-dimensional (2D) locating methods are helpful but fail to show a pilot where airports are from the pilot's perspective looking outside the aircraft's windscreen. Synthetic vision (also known as virtual reality (VR)) systems use computer-generated images that mimic reality rather than actual real-time photographic/video images. However, VR makes a pilot mentally map the real world to the computer-generated images, causing delays and safety issues.

Augmented reality (AR) differs from VR in that AR places computer-generated images over real-time video images so the resulting image combines both reality and computer-generated overlays. Use of AR systems in aviation may be limited due to expensive computing systems, exotic sensor hardware and, often, awkward special glasses.

Inexpensive and widely adopted smartphones and computing tablets (such as iPhones, iPads, Android phones and tablets) have sufficient computing power for AR but have not yet been utilized for aviation. Such devices often include position sensors, but the accuracy, stability, and reliability of these sensors are generally insufficient for aviation use, as aircraft have harsh environments for delicate electronics due to electrical and magnetic interference and jolting physical motion. In addition, while some aircraft have external cameras that can provide a video feed, this invention does not assume a fixed position because the smartphone or tablet may be oriented along all three axes (yaw, pitch, and roll). This allows a pilot to rotate and otherwise move the hand-held device to look for aviation objects, such as but not limited to airports, that may not be visible directly out the front or other window of the aircraft.

Described herein are embodiments that use inexpensive electronic devices such as smartphones and tablets to produce AR in the harsh environment of an aircraft. The embodiments use novel data processing systems, a comprehensive aviation database, and optional external hardware to produce an aviation AR system with very low cost, high accuracy, and wide availability.

Specifically, embodiments herein take real-time video feed from an image capture device (ICD) such as a smartphone or tablet (e.g., iPad, Android tablet, Windows tablet, etc.), use position sensors internal to the ICD or from one or more external devices, and access a database of aviation object locations (such as but not limited to airports) to produce an AR overlay of aviation objects and other information over the video feed. Some embodiments compute the field of view of the ICD and project aviation objects that are within the field of view over a live video feed while a user moves the smartphone or tablet to any position and/or angle within the aircraft. The computation of the field of view and the projection of aviation objects over a video feed enable a pilot to use a small handheld device to "look around" for airports and other aviation objects that may not be in physical view.

The terminology used herein is for the purpose of describing particular embodiments only and is not intended to be limiting of the invention. As used herein, "one embodiment" or "an embodiment" means that a particular feature, structure or characteristic described in connection with the embodiment is included in at least one embodiment. Thus, the appearances of the phrases "in one embodiment" or "in an embodiment" herein are not necessarily all referring to the same embodiment. Furthermore, the particular features, structures, or characteristics may be combined or assembled in any suitable manner in one or more embodiments. As used herein, the term "and/or" includes any and all combinations of one or more of the associated items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical, aviation, and scientific terms) used herein have the same meaning as commonly understood by one having ordinary skills in the art to which this invention belongs. It will be further understood that terms, such as those defined in commonly used dictionaries, should be interpreted as having a meaning that is consistent with their meaning in the context of the relevant art and the present disclosure, unless otherwise defined herein.

In describing the embodiments below, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the score of the invention and the claims.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates an image capture device (ICD) 100 (e.g., smartphone, tablet, or camera) using embodiments described herein to produce an AR image. The ICD 100 may be running any operating system (e.g., iOS, Android, Windows, Linux, etc.) and using any hardware configuration. The ICD 100 camera supplies the base video. Embodiments use modules, algorithms, computer code, sensor input (GPS, yaw, pitch, heading) and an aviation database to calculate the position of nearby aviation objects (e.g., a first airport 102, a second airport 104, and a third airport 106).

In some embodiments, the airports 102, 104, 106 may be tagged with information boxes containing various items such as the Federal Aviation Administration (FAA) or International Civil Aviation Organization (ICAO) identifiers for the airports (e.g., identifiers 112, 114, 116), distance away from the aircraft (e.g., distance markers 122, 124, and 126) or other information desired by pilots. The information boxes may have arrows (e.g., information boxes associated with the first and second airports 102 and 104) showing the location of the aviation objects, or may not have arrows (e.g., information boxes associated with the third airport 106). A control button 130 or buttons or other user-input mechanisms may be used to alter the display, such as by selecting which types of objects are shown, calibrating the system (see FIG. 4) or performing other functions.

In some embodiments, the ICD may display a flight course 132 for the aircraft. flight course may be a series of boxes or hoops, or a three-dimensional (3D) corridor.

Figure 2:
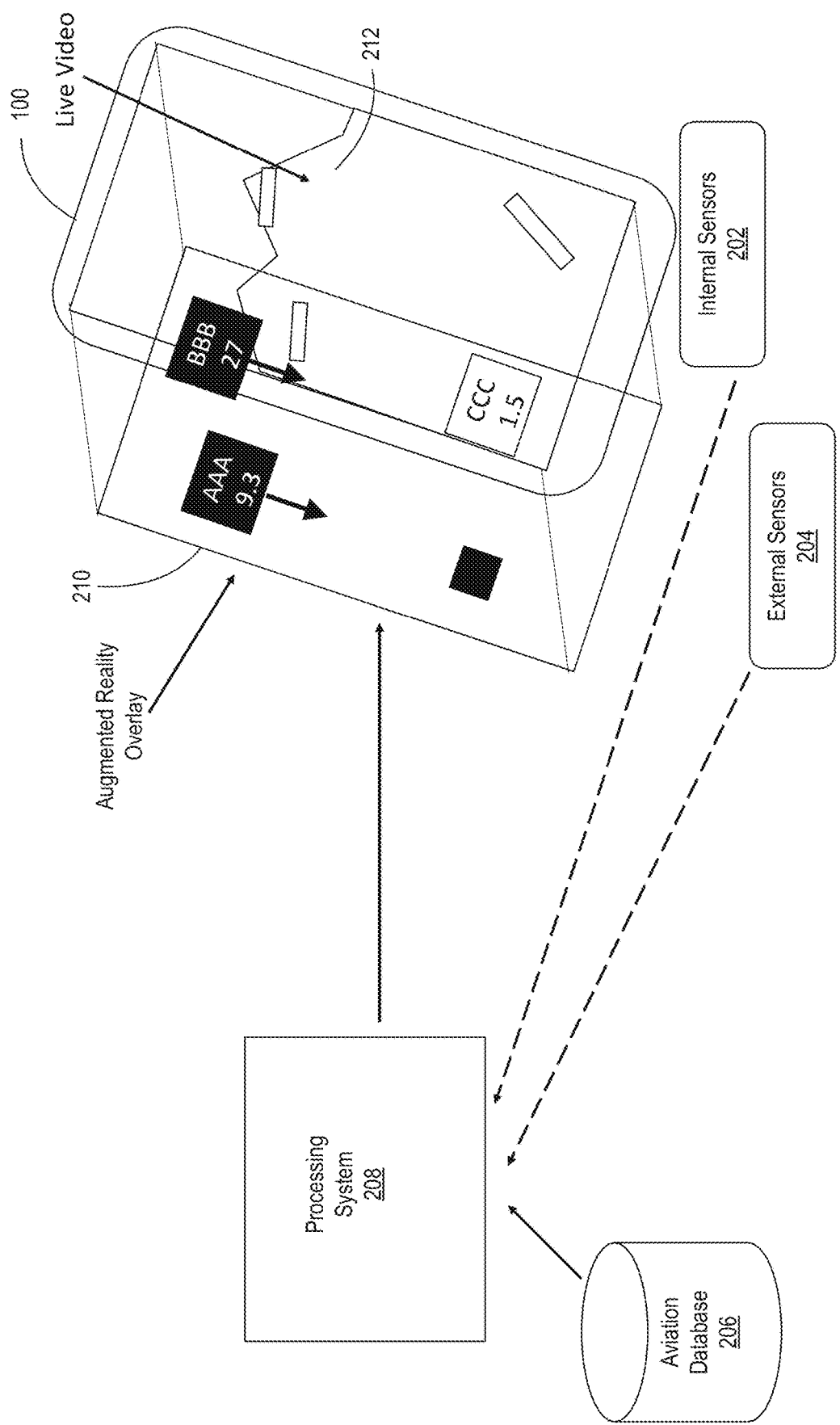
FIG. 2 shows a functional interaction between internal sensors on the image capture device and/or external sensors, an aviation database, and a processing system.

FIG. 2 shows a functional interaction between internal sensors 202 on the ICD 100 and/or external sensors 204, an aviation database 206, and a processing system 208. The processing system 208 may receive information from the external sensors 204 and the aviation database 206, and may generate an AR overlay 210 on top of ICD video 212.

The ICD 100 may have one or more internal sensors 202 that may be used by the processing system 208 to determine the location and/or orientation of the ICD 100. For example, the ICD 100 may include a GPS sensor, an Attitude Heading Reference System (AHRS) (essentially a solid-state three-axis gyro), pressure sensors, a compass, an accelerometer, a gyroscope, and more. The GPS sensor may be used for location of the ICD 100 and to determine a ground vector. A ground vector is the velocity and the direction of travel of the ICD 100. The compass may be used to determine a lateral angle of the ICD 100. The accelerometer may be used to determine movement around an axis. A gyroscope or accelerometer may be used to determine a vertical angle or pitch of ICD 100. For example, the accelerometer may be used to determine movement around an axis, and the gyroscope may be used to determine position around an axis.

External sensors 204 may also be in communication with the processing system 208. The data from the external sensors 204 may supplement or replace some of the data from the internal sensors 202. For example, the ICD 100 may be a smartphone or tablet that lacks one or more of the internal sensors 202 described above. The external sensors 204 may be used to provide information not produced by the internal sensors 202. In some cases the external sensors 204 may be more accurate than the internal sensors 202. The external sensors 204 may include avionic sensors, an external GPS sensor, an AHRS, a pitot static system, an aircraft engine data system, and a mobile device. Avionic sensors may detect heading, speed, altitude, and wind data that may be used to define an aircraft vector. The external GPS may be embedded in an Automatic Dependent Surveillance-Broadcast (ADS-B) and provide location, altitude, and a ground vector. The AHRS may provide aircraft pitch, roll, and yaw.

The processing system 208 can use input from the ICD's internal sensors 202 and input from any number of external sensors 204 simultaneously or independently. For example, in a first mode, the processing system 208 may only use the internal sensors 202. The processing system 208 may use an ICD GPS to determine a location of and to track the ICD 100. The processing system 208 may use an ICD compass to determine a lateral angle. The processing system 208 may use an ICD accelerometer or gyroscope to determine vertical angle. One method to improve accuracy of the AR overlay 210 is to use the external sensors 204. The external sensors 204 may provide more accurate information to the processing system 208. In some embodiments, if an external GPS is in communication with the processing system 208, the external GPS data will replace any internal GPS data to improve accuracy.

In some embodiments, the processing system 208 refines and corrects for hardware sensor errors and erratic readings. Errors may include sensor drift, wind factor, or a compass error. To account for these errors, the processing system 208 may compare, combine, or otherwise use data from the external sensors 204, the internal sensors 202, and a user.

In a second mode, the processing system 208 may calibrate the data received from the internal sensors 202 and external sensors 204 by determining a ground vector defining heading and speed of the ICD 100, based on a GPS track of the ICD 100. The processing system 208 may further determine an aircraft vector defining a heading and speed of the aircraft. The aircraft vector may be based on user input or avionics. The processing system 208 may compare the ground vector to the aircraft vectors to determine an error due to wind (AG error). For example, the processing system 208 may find a difference in the ground vector and the aircraft vector.

To account for sensor errors, the ICD 100 may be set to a calibration orientation within the aircraft. The calibration orientation may be any previously defined orientation within the aircraft. The calibration orientation may allow the processing system 208 to determine an orientation of the ICD 100 within the aircraft. For example, if the calibration orientation is portrait mode and facing the front of the aircraft, the processing system 208 may determine a compass sensor error. The processing system 208 may determine an error between an ICD compass and aircraft track (compass error) by determining the difference between data received from the ICD compass and the aircraft track.

The processing system 208 may use the AG error and the compass error to correct ICD data. For example, the processing system 208 may correct compass data to provide a more accurate lateral angle of the ICD 100 by accounting for the AG error and the compass error. Drift caused by the electrical, magnetic, physical, or audible "noise" of the aircraft may result in the errors changing. In some embodiments, the processing system 208 can prompt for recalibration after a threshold period of time or a threshold distance has been reached. In some embodiments, the processing system 208 can detect drift using avionic sensors and prompt for recalibration.

In a third mode, the orientation of the ICD 100 may be fixed relative to the aircraft. In these embodiments, the processing system 208 may determine the location and ground vector using an internal or external GPS. Because the orientation is fixed, the processing system 208 may use the aircraft vector to determine the orientation of the ICD 100. Additionally, the processing system 208 may compare the ground vector to the aircraft vector to determine any AG error. In some embodiments, the ICD 100 can enable selection of different fixed lateral/vertical angles (e.g., front, starboard, port, 45 starboard, 45 port, etc.). Each angle may correspond to a respective set of predetermined lateral/vertical angle orientations that allow the processing system 208 to determine orientation of the ICD 100.

In a fourth mode, one axis of rotation of the ICD 100 may fixed and a second axis of rotation may be variable. For example, the ICD 100 may have a fixed lateral angle and a variable pitch. This enables the ICD 100 to tilt up and down while staying fixed relative to lateral direction. In these embodiments, an internal or external GPS may be used by the processing system 208 to determine location and a ground vector. The ICD 100 may be set to a selected lateral angle with respect to the aircraft. The lateral angle may take the AG error into account. The processing system 208 may determine the vertical angle of the ICD 100 using data from the accelerometer or gyroscope of the ICD 100.

The processing system 208 may be part of the ICD 100 or an external device. For example, a smart image display device (SIDD) may include the processing system 208 and operate an AR application. The SIDD would receive images streamed from the ICD 100. Additionally, the ICD 100 may send sensor information from available internal sensors 202. An SIDD may determine location and orientation for images streamed from the ICD 100, augment images with AR elements, and display augmented images. The SIDD may include its own sensors such as a GPS sensor.

The processing system 208 may determine what sensor information is available from the internal sensors 202 and operate in one of the modes described above based on the available sensor information. For example, if the ICD 100 is fixed or has no sensors, the processing system 208 may operate in mode 3 where the ICD 100 has a fixed orientation and can use an external GPS to determine the location and ground vector of the ICD 100. When the ICD 100 has a GPS sensor but no compass, accelerometer or gyroscope, the processing system 208 may operate in mode 3 with either the ICD GPS or an external GPS. If the ICD 100 has an accelerometer or gyroscope but does not have a compass, the processing system 208 can operate in mode 3 or mode 4. The vertical angle of the ICD 100 may be fixed in mode 3, whereas in mode 4 the processing system 208 can use accelerometer or gyroscope data to determine a vertical angle of the ICD 100. If the ICD 100 has a compass and an accelerometer or gyroscope, the processing system 208 may operate in any of modes 1-4. Similarly, if the ICD 100 has a GPS, compass and accelerometer or gyroscope, the processing system 208 may operate in any of modes 1-4.

The processing system 208 may refine or replace orientation data based on aircraft maneuvering or available sensors. For example, the processing system 208 may replace an internal GPS with an external GPS for additional accuracy. The replacement of sensors may be automatic when paired to the ICD 100 through Bluetooth or other connections. The processing system 208 may suppress sensor data that is susceptible to g-force perturbations during aircraft maneuvering (e.g., a turn). In some embodiments, the processing system 208 may suppress or ignore sensors susceptible to g-force perturbations if such sensor data deviates from other sensor data not susceptible to such perturbations (e.g., GPS data, AHRS).

The AR system may store or maintain location tagged aviation objects. The aviation objects may include static aviation objects that are pre-defined in the aviation database 206, user defined aviation objects, and dynamic aviation objects that are not pre-defined in the aviation database 206.

A static aviation object may include airports, airport runways, airspace corridors (airways), navigation beacons (navaids), fixes, obstacles, terrain data, air route traffic control center (ARTCC) radio frequencies and/or change-over points. Stored information about the airport may include designation, communication info, classification, and diagrams. Information about the airport runways may include the coordinate location of each runway. Terrain data may be from a terrain awareness and warning system (TAWS).

User defined aviation objects may include flight course related information. For example, the user defined aviation may include a flight course (generally known as a flight plan line). The flight course may be illustrated on the AR overlay 210 as a series of location points or a solid line. For example, the flight course may be a series of boxes or hoops, or a three-dimensional (3D) corridor. The user defined aviation objects may also include personal waypoint locations, and personal procedures. The user defined aviation objects may be linked together into a flight plane leg.

Dynamic aviation objects are not pre-determined, and may be based on current conditions. For example, dynamic aviation objects may include current weather. The AR overlay 210 may tag weather conditions with location, or tag airports/runways with current weather conditions. The dynamic aviation objects may further include METARs, terminal aerodrome forecasts (TAFs), Winds Aloft, cloud layers, NexRad (radar), or any other pilot-used weather charts/data. The dynamic aviation objects may also include air traffic. In some embodiments, the AR overlay 210 may include a graphical representation of position, heading, speed, tail number, transponder, or ADS-B code of other aircraft. The dynamic aviation objects may also include notice of airmen (NOTAM), military operations area (MOA), and temporary airspace restrictions. The temporary airspace restrictions may include stadium, firefighting, or other temporary flight restrictions.

Dynamic aviation objects may be received from a plurality of resources (not pictured). These resources may include an ADS-B. In some embodiments a mobile network may be used to receive the dynamic aviation objects. In some embodiments a network push service may provide push notifications regarding current conditions based on a registered flight plan.

In some embodiments, the dynamic aviation objects may be received from avionics of an aircraft. The avionics may have a wireless or wired feed to the processing system 208.

The avionics may include GPS, navigator, FMS, MFD, ADS-B, pitot static system data, engine and/or airframe data, satellite or Sat-phone enabled devices. These avionics may enable the processing system 208 to connect to the Internet or receive ground broadcast data valuable for flight navigation.

Figure 3:
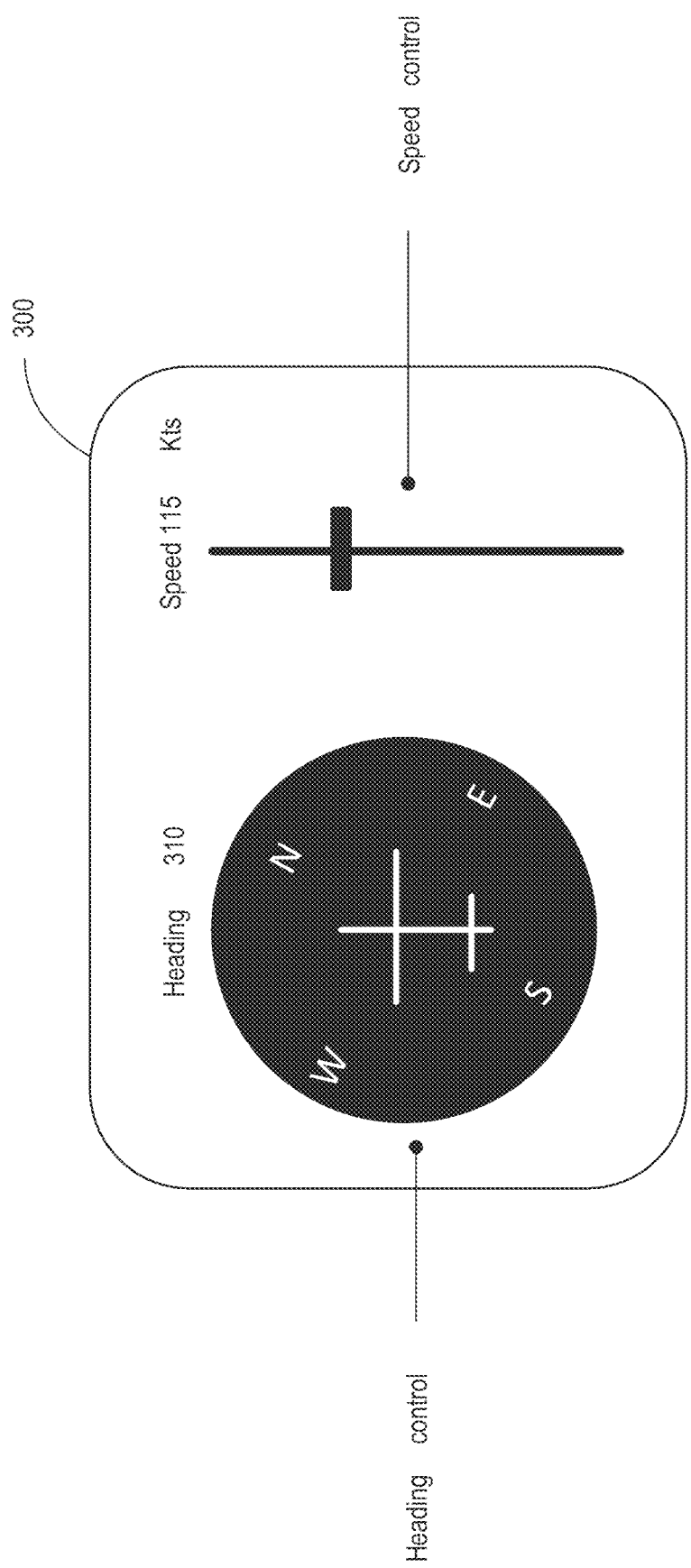
FIG. 3 illustrates a graphical user interface for inputting speed and heading.

FIG. 3 illustrates a graphical user interface 300 for inputting speed and heading. Some embodiments of an AR system may refine and correct for hardware sensor errors and erratic readings. An AR system may use user-inputted aircraft data such as speed and heading to refine the sensor-provided heading.

Any type of input method may be used, including but not limited to spinning dials, sliders, text entry, voice recognition, or data fed from other systems such as in-panel avionics. The AR system may use the course and/or speed of the aircraft, as derived from a series of multiple latitude/longitude points, to help correct for sensor drift and/or other errors. For example, the AR system may compare a ground vector determined from a series of GPS readings to an aircraft vector from the user-input data to determine any AG error.

Other user-entered data may also be used. For example, if the motion sensors imply that the aircraft has made a sharp turn but the GPS indicates no such turn, the invention can override the motion sensors to provide better accuracy to the pilot, because solid-state motion sensors such as those found on smartphones and tablets are known to exhibit drift (precession) over time, especially given the harsh vibration and electrical environment of an aircraft. For example, an AR system may compare GPS data and data from an accelerometer or gyroscope. If GPS data does not agree with the data from the accelerometer or gyroscope, the AR system may determine that the accelerometer or gyroscope has drifted. The AR system may override or ignore data from any motion sensor, such as the accelerometer or gyroscope in response to comparing the data to GPS and determining that the GPS data does not match the motion sensor data. Thus, the AR system may suppress or ignore data from sensors susceptible to g-force perturbations during a turn or if the sensors differ significantly from sensors that are not susceptible to drift under the same perturbations.

A further calibration and locking mechanism (not shown) may also be used to refine accuracy even more when the user instructs the invention that the camera is looking straight out the aircraft's front window rather than being moved arbitrarily. During calibration, the AR system may determine a compass error and an AG error. The AR system may prompt for a recalibration after a certain amount of time or distance. The AR system may also prompt for a recalibration if the AR system detects drift in the sensor data.

Figure 4:
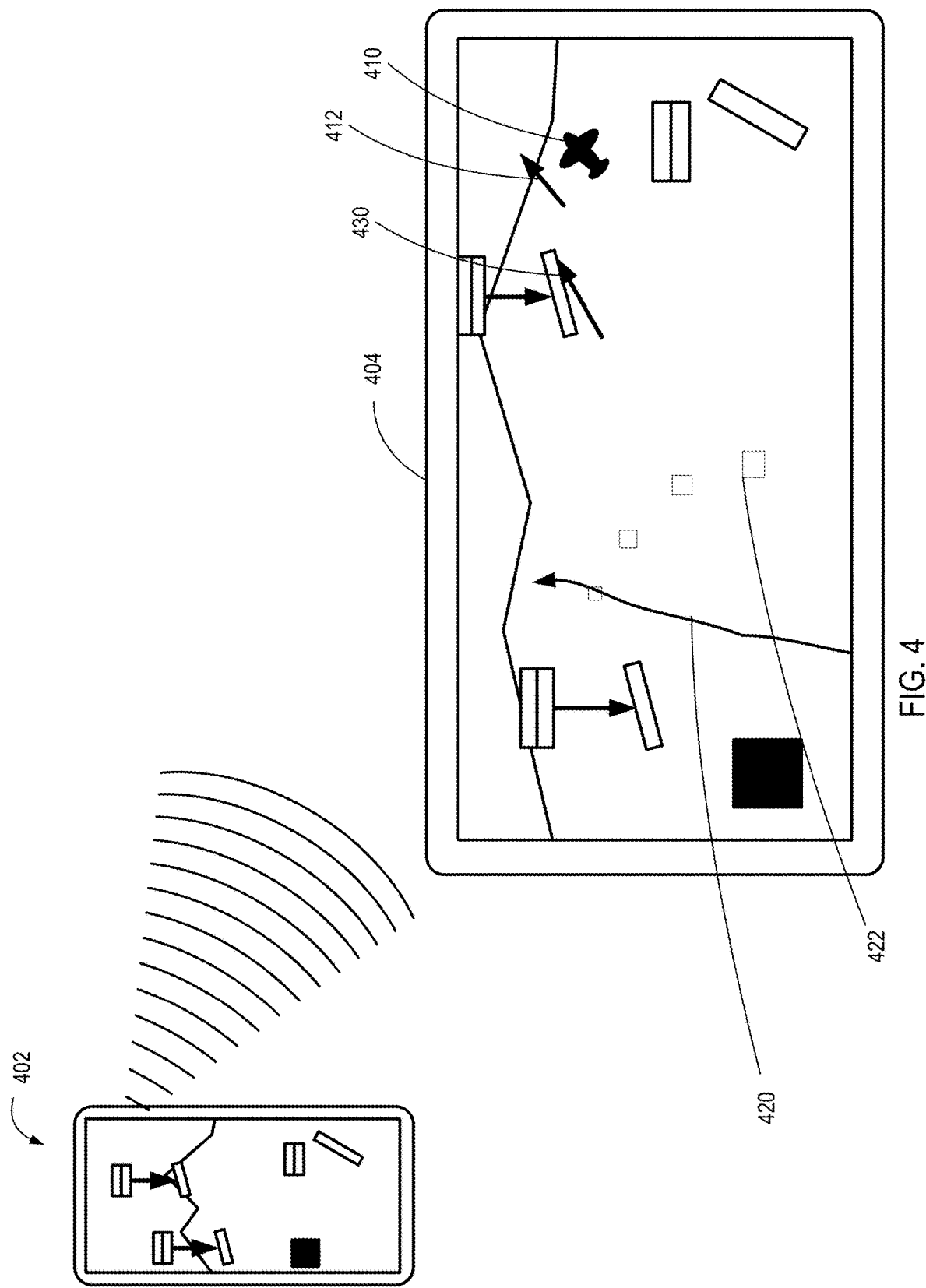
FIG. 4 shows a smartphone that may be held by a pilot or positioned such as to look out the windscreen while connected to a tablet that may be in a different position.
Figure 5:
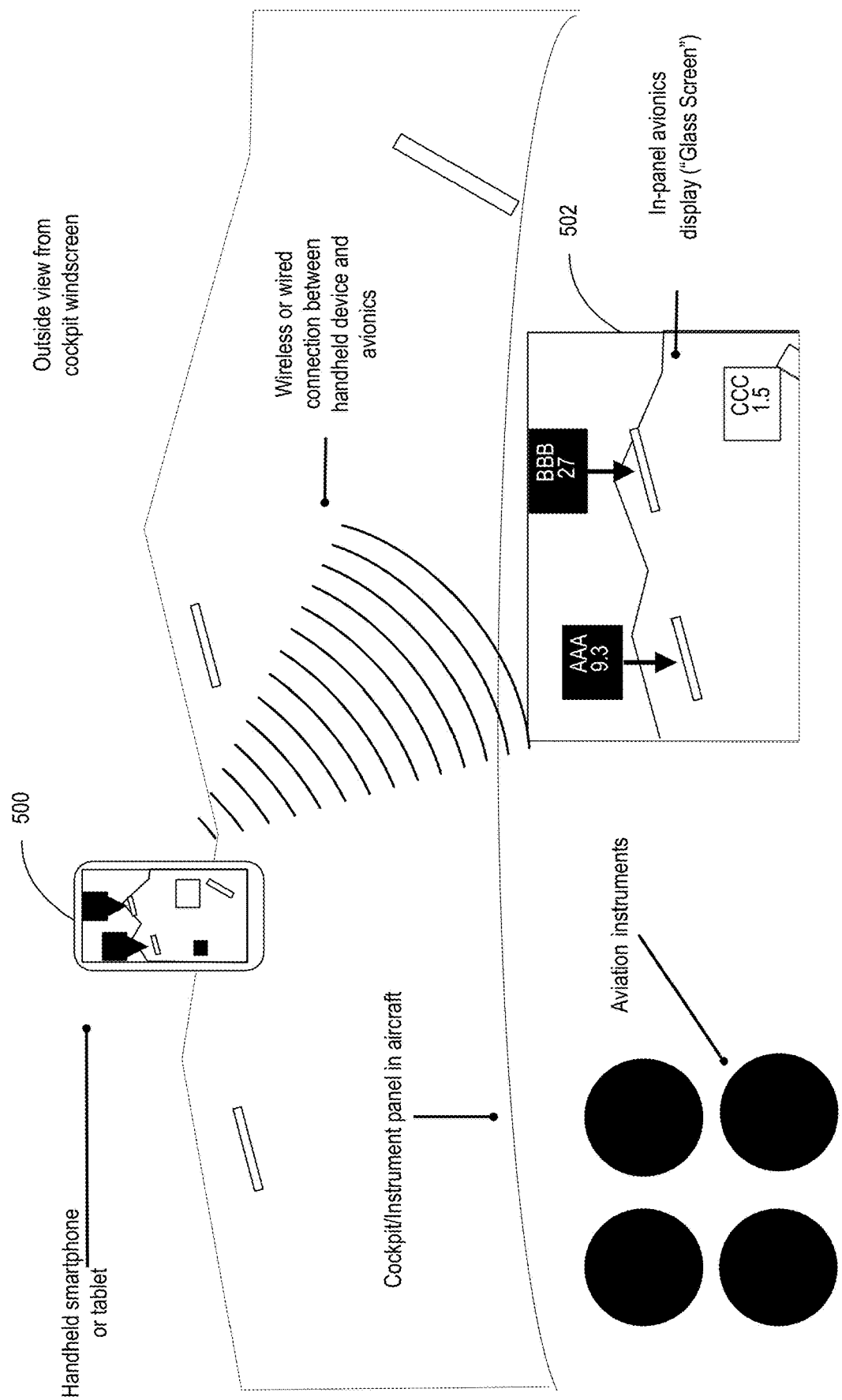
FIG. 5 illustrates a smartphone being used as a remote sensor and an AR generation device for avionics installed in the aircraft.

An AR system may use multiple devices. In some embodiments, such as shown in FIG. 2, an AR system may use an external GPS and/or AHRS to further refine position accuracy. The AR system may also connect to other smartphones, tablets, portable computing devices, and in-panel avionics. Such connections may be one-way or two-way. "One-way" may mean positional and other data from such external devices is fed into the primary smartphone/tablet used in the invention or may mean sensors, the video feed, or other data from the primary smartphone/tablet could be sent to the external hardware (FIGS. 4 and 5). In a two-way situation, data may flow from an external in-panel or other device to the smartphone or tablet for processing; then the smartphone or tablet may send data such as but not limited to live video merged with AR information to the in-panel or other device.

FIG. 4 shows an AR system using a smartphone 402 that may be held by a pilot or positioned such as to look out the windscreen while connected to a tablet 404 that may be positioned in the pilot's lap (and, therefore, may not be able to use the tablet's camera to look outside). In some embodiments, the connection between the two devices may be direct wireless connections using any method. In some embodiments, the connection may be indirect connections via mutual connections with a third device (e.g., a WiFi router, ADS-B system, and/or the like). In some embodiments, the connection may involve physical connections.

In some embodiments, an AR system may display other aircraft 410 on the tablet 404. The AR system may also display an associated vector 412 with the other aircraft 410 to illustrate speed and heading of the other aircraft 410. This information may be obtained from ab ADS-B system. In some embodiments, the AR system may also display an approach vector 420 for a runway.

In some embodiments, an AR system may also detect when an aircraft is off of a flight path 420. When the AR system detects a deviation from the flight plan above a threshold distance, the AR system may determine a flight correction and display a correction path 422. The correction path 422 may lead an aircraft back onto the original flight path 420.

FIG. 5 illustrates a smartphone 500 being used as a remote sensing and AR generation device for avionics 502 installed in the aircraft. While some aircraft have external cameras, the smartphone 500 has the ability to rotate and otherwise orient the field of view from other than straight ahead. This allows a pilot to "look around" for airports and other aviation objects not in view. This is not generally possible or practical with external cameras. An AR system for avionics may allow for multiple connections between the remote sensing and AR generation device and other devices.

In some embodiments, the AR system may broadcast data to devices connected beyond the cockpit via in-flight Internet or other network using any wireless or wired devices and/or systems. This may allow ground crews or passengers to view the same AR image as the pilot.

To relieve pilot workload, the AR system may involve various filtering techniques to limit which airports or aviation objects are shown. Such filters include but are not limited to different types of airports (for example, land vs. seaplane vs. heliports); airport use, size, or classification; and distance filters relative to the aircraft.

The aviation objects may be shown with a variety of information such as but not limited to airport FAA or ICAO designation, distance from the aircraft, relative direction from the aircraft, weather at the location, runway and communication information, classification of airport, and diagrams of the runways at the airport. Some examples of this are shown in FIG. 1.

To further aid pilots, the AR image may include a representation of the desired flight course (generally known as a flight plan line) over the video. This "line" may be a series of boxes or hoops, dashed or solid lines, or other indicators. A forward-looking line or ring may be also projected from the aircraft to aid the pilot in understanding where the aircraft will be at a certain time or once it has travelled a certain distance on its present course.

Some implementations may add other information to the AR image such as weather indications, position of other aircraft, distance and time markers, and more. For example, aviation often categorizes airport weather conditions using three, four, or five different danger levels. The factors that determine these levels are not always apparent to the eye, so the AR system can use color, markers, or any other system to indicate weather conditions to the pilot.

Figure 6:
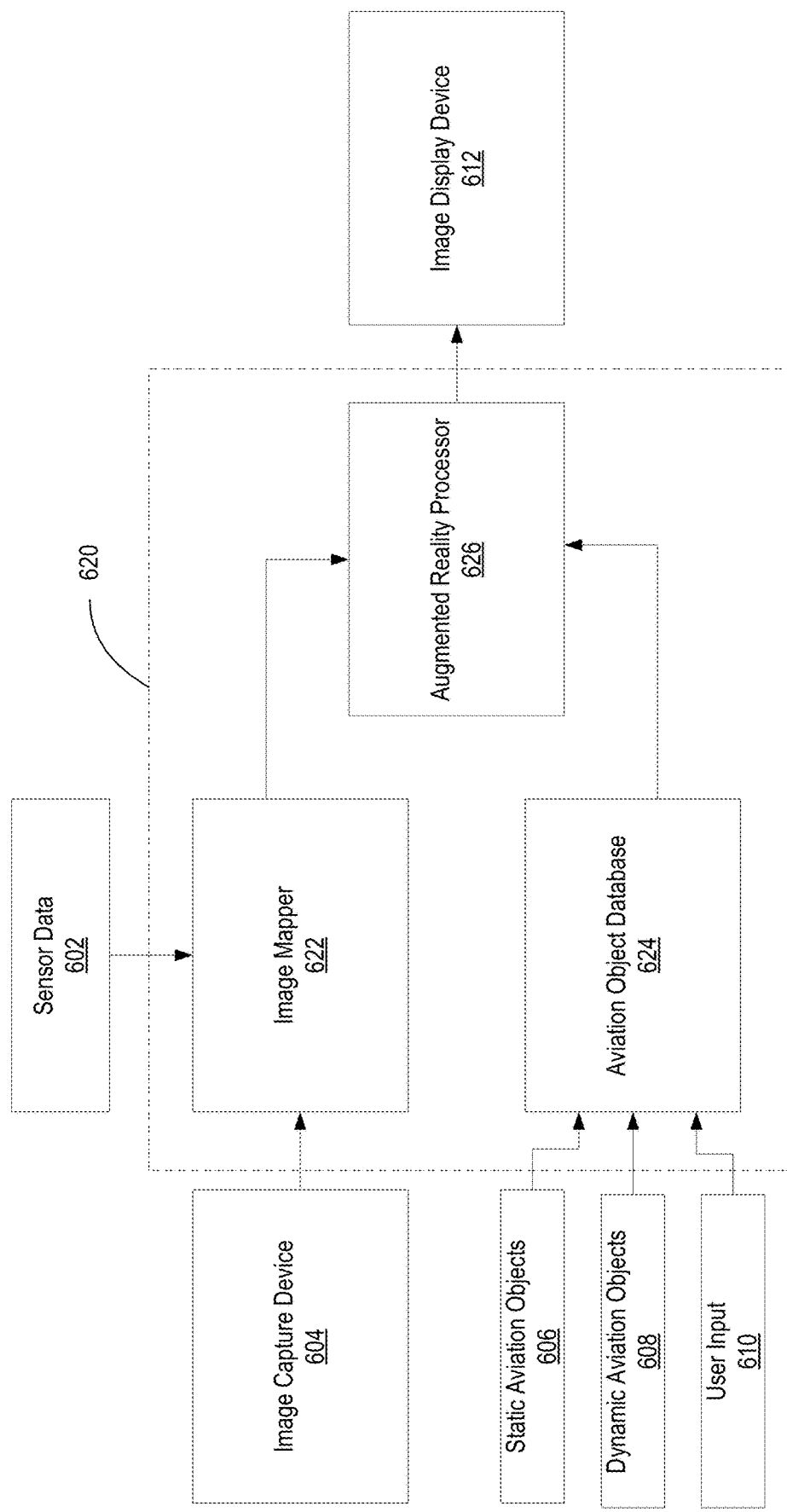
FIG. 6 is a functional block diagram of an AR system according to one embodiment.

FIG. 6 is a functional block diagram of an AR system 620 according to one embodiment. The AR system 620 may comprise an image mapper 622, an aviation object database 624, and an AR processor 626. The AR system 620 may receive an image stream and overlay the image stream with 2D or 3D graphical elements representative of aviation objects.

The AR system 620 may be incorporated in a device or may be an external system. In some embodiments, an image capture device 604 captures an image and sends the image to the AR system 620. The AR system 620 augments the image and sends it to the image display device 612 for displaying the augmented image. As discussed in more detail below, the AR system 620, image capture device 604, and the image display device 612 may be a single device or multiple devices.

In some embodiments, the AR system 620 may be incorporated in an image capture device 604. The image capture device 604 with the AR system 620 may be considered a smart image capture device (SICD). The SICD may capture image(s) and run an AR application. The SICD determines position/orientation of image(s), applies AR elements, and streams AR images to an image display device 612 for display. In some embodiments, the SICD may operate in one of the modes described with reference to FIG. 2. In some embodiments the image display device 612 does not run any custom code. Instead the image display device 612 simply displays images from the SICD. In some embodiments, the image display device 612 may display images in a browser interface and operate a minimal web service to provide a steaming interface. The browser interface may enable users to interact with the AR system 620 (settings, calibration, etc.). In some embodiments, the SICD may provide an interface used to configure image(s) being streamed to the image display device 612. In some embodiments, the image display device 612 may provide some interface configured to display and/or interact with AR images streamed from the SICD. The interface may also enable users to configure the AR system 620 running on the SICD (e.g., set mode, orientation, calibration, etc.).

In other embodiments, the AR system 620 may be incorporated in the image display device 612. For example, the AR system 620 may operate on a smart image display device (SIDD). The SIDD may comprise any suitable computing device. For example the computing device may be a mobile computing device, such as a smartphone or tablet. In some embodiments, the SIDD may be incorporated with in-panel avionics. The SIDD may determine location/orientation for images streamed from an external ICD (e.g., image capture device 604), augments images with AR elements, and displays augmented images as above, variations. Where an ICD position is fixed or the ICD has no sensors, the SIDD may operates in Mode 3 as described with reference to FIG. 2. Where the ICD has GPS and no compass, or accelerometer/gyroscope, the SIDD may operates in Mode 3 and use SIDD or external GPS. In embodiments where the ICD has an accelerometer or gyroscope and no compass, the SIDD can operate in Mode 3 or 4. In embodiments where the ICD has a compass and a accelerometer or gyroscope, the SIDD can operate in one of modes 1-4. In embodiments where the ICD has a GPS, compass, accelerometer or gyroscope, the SIDD can operate in one of Modes 1-4

In some embodiments, the image capture device 604, the image display device 612 and the AR system 620 may be a single device. For example, a smartphone, tablet or other personal electronic device may include the image capture device 604, the image display device 612 and the AR system 620. If the image capture device 604 has a compass and accelerometer/gyroscope, the AR system 620 may operate in modes 1-4 (see FIG. 2), and use an internal or external GPS. If the image capture device 604 has no compass or accelerometer/gyroscope, the AR system 620 may operate in mode 3 (see FIG. 2). If the image capture device 604 has an accelerometer or gyroscope but no compass, the AR system 620 may operate in mode 3 or 4 (see FIG. 2). If the image capture device 604 has a GPS, compass, and accelerometer or gyroscope, the AR system 620 may operate in one of modes 1-4.

The image mapper 622 may determine a field of view of images captured by the image capture device 604. The image mapper 622 may determine the field of view based on sensor data 602. The sensor data 602 may be from the image capture device 604, avionics, or user input. The sensor data 602 may include a location, a vertical angle, and a lateral angle of the image capture device 604. In addition, the image mapper 622 may correct for wind errors and/or compass sensor errors. The field of view and images may be output to the AR processor 626.

The aviation object database 624 can store and maintain aviation objects. The aviation object database 624 may receive static aviation objects 606, dynamic aviation objects 608, and user input aviation objects 610. Dynamic objects 608 may be received from an ADS-B, network, push service network, or avionics. The aviation object database 624 may output aviation objects to the AR processor 626.

The AR processor 626 receives the field of view, images, and aviation objects. The AR processor 626 may identify aviation objects within the field of view of the images, and overlay graphical elements representative of aviation objects within the field of view on the images to create an AR image. The AR processor 626 may output the AR image to the image display device 612 for display.

The image display device 612 may show the image from the image capture device 604 overlaid with the graphical user interface elements. In some embodiments, the image display device 612 may also include user interface controls. For example, a user may interface with the augmented image by selecting an element corresponding to an aviation object to invoke an interface comprising additional information pertaining to the aviation object. For example, selecting an airport may provide airport details. The interface may also allow a user to change operating modes of the AR system 620 or a fixed orientation of the image capture device 604. The interface may include calibration and pairing controls. The pairing controls may facilitate pairing with external device(s), avionics, external ICD, etc.

The AR system 620 may update the graphical user interface elements in response to changes to the field of view captured by the image capture device 604. For example, the graphical user interface elements may change in response to a change in position/orientation of the image capture device 604. Further, the graphical user interface elements may change in response to a change in "lens" setting(s) of the image capture device 604 (e.g., zoom in/out). Additionally, the graphical user interface elements may change in response to detection of new dynamic or user-defined aviation objects 608, 610.

For example, the AR system 620 may detect a dynamic aviation object or static aviation from a source such as an ADS-B. The aviation object database 624 may tag the aviation object with identifying information including coordinates, name, and type of object. The image mapper 622 may get an image and tag the image with coordinates of a field of view (e.g. coordinates associated with the corners of the image). The augmented reality processor 626 may determine the aviation objects within the coordinates of the field of view and retrieve a representative image associated with each aviation object type. The augmented reality processor 626 may scale and place the representative image on the image from the image capture device. The augmented reality processor 626 may determine location to place the representative images by creating a coordinate system for the image based on the field of view and correlating the coordinate system of the image with actual coordinates of aviation objects. The image display device 612 may display an AR image.

Figure 7:
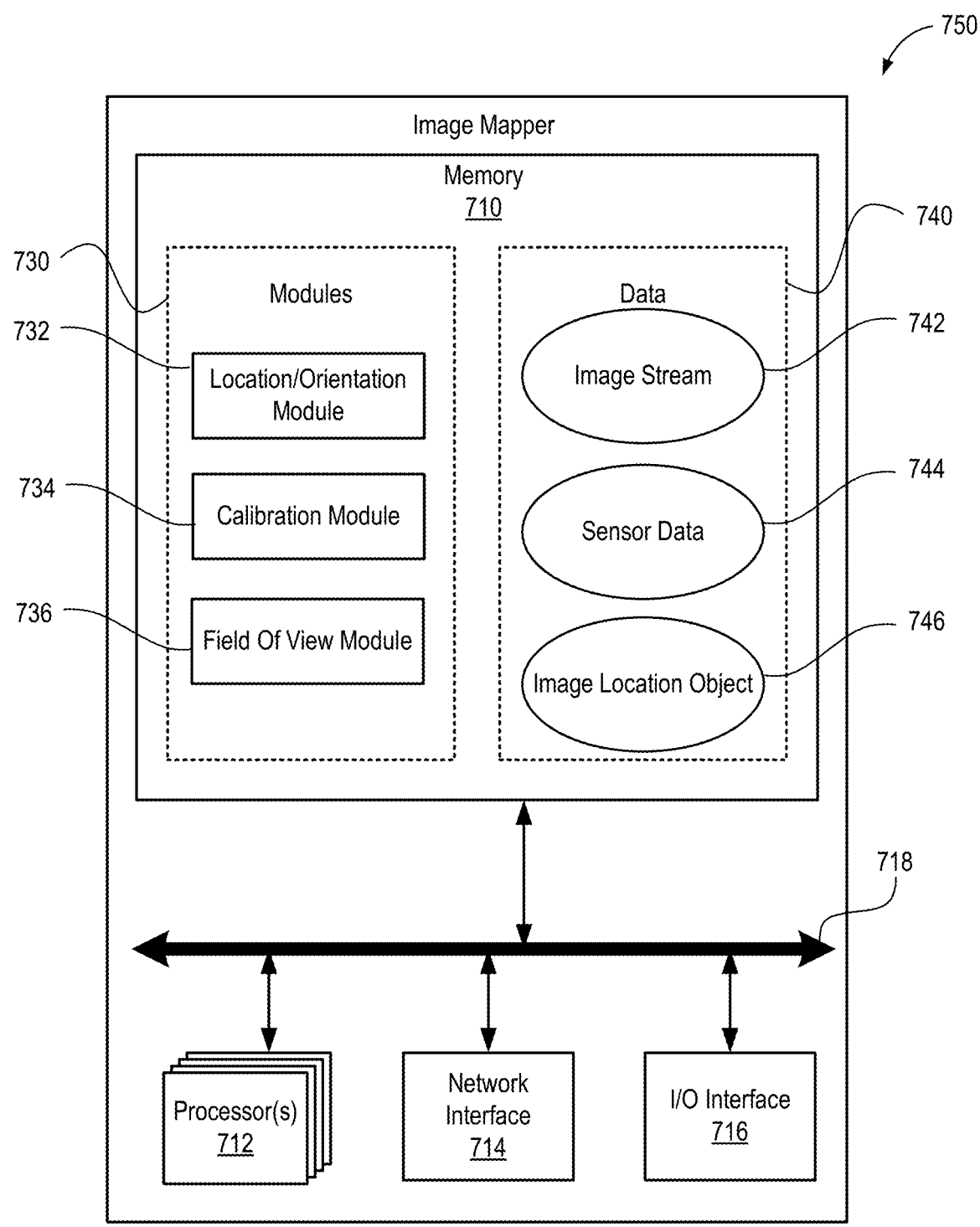
FIG. 7 is a block diagram of an image mapper, according to one embodiment.

FIG. 7 is a block diagram of an image mapper 750, according to one embodiment. The image mapper 750 may include an electronic memory 710, one or more processors 712, a network interface 714, and an I/O interface 716.

The electronic memory 710 may include static RAM, dynamic RAM, flash memory, one or more flip-flops, or other electronic storage medium. The electronic memory 710 may include a plurality of modules 730 and data 740. The modules 730 may include all or portions of other elements of the device. The modules 730 may run multiple operations serially, concurrently or in parallel by or on the one or more processors 712.

In some embodiments, portions of the disclosed modules 730, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules 730, components, and/or facilities disclosed herein may be implemented and/or embodied as a driver, a library, an interface, an API, field-programmable gate array (FPGA) configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

The modules 730 may include a location/orientation module 732, a calibration module 734, and a field of view module 736. The location/orientation module 732 may, by the one or more processors 712, perform operations to a location and orientation of an image capture device, based on sensor data 744 associated with the image capture device, such as a GPS, accelerometer, gyroscope, avionics, ADS-B, etc.

The calibration module 734 may correct errors in the sensor data 744. For example, the calibration module 734 may calibrate the data received from the sensors by determining a ground vector defining heading and speed of the image capture device, based on a GPS track. The calibration module 734 may further determine an aircraft vector defining a heading and speed of the aircraft. The aircraft vector may be based on user input or avionics. The calibration module 734 may compare the ground vector to the aircraft vectors to determine an error due to wind (AG error). For example, the calibration module 734 may find a difference in the ground vector and the aircraft vector.

To account for sensor errors, the image capture device may be set to a calibration orientation within the aircraft. The calibration orientation may be any previously defined orientation within the aircraft. The calibration orientation may allow the calibration module 734 to determine an orientation of the image capture device within the aircraft. For example, if the calibration orientation is portrait mode and facing the front of the aircraft, the calibration module 734 may determine an orientation and angle of the ICD. The calibration module 734 may determine an error between an image capture device compass and aircraft track (compass error) by determining the difference between data received from the image capture device compass and the aircraft track.

The calibration module 734 may use the AG error and the compass error to correct sensor data. For example, the calibration module 734 may correct compass data to provide a more accurate lateral angle of the image capture device by accounting for the AG error and the compass error. Drift caused by the noise of the aircraft may result in the errors changing. In some embodiments, the calibration module 734 can prompt for recalibration after a threshold period of time or a threshold distance has been reached. In some embodiments, the calibration module 734 can detect drift using avionic sensors and prompt for recalibration. For example, the calibration module 734 acquire GPS data and data from a motion sensor (e.g., gyroscope or accelerometer). The calibration module 734 may compare the GPS data to the motion sensor data. The calibration module 734 may determine an error in the motion sensor data if a threshold difference is reached. For example, a threshold difference may be reached if the motion sensor data represents a turn while the GPS data does not. If the calibration module 734 determines the threshold difference has been reached, the calibration module 734 may suppress, ignore, or correct motion sensor data. For example, the calibration module 734 may use motion sensor data from before the threshold difference was reached until the difference is under the threshold difference again.

The field of view module 736 may determine the area viewable in the image based on the location and orientation of the image capture device. To determine the field of view, the field of view module 736 may use data about the image capture device. For example, the lens focal length and the image size may be used. In some embodiments, the field of view module 736 may receive location information, angle information, sensor size information, and focal length information of an ICD. The field of view module 736 may determine the angle of view of the camera and the field of view of the camera by using the sensor size and lens focal length of the ICD. The field of view module 736 may use the angle of view and the field of view in combination with the location, elevation, and orientation of the ICD.

The data 740 stored on the electronic memory 710 may include the data 740 received from an image capture device and associated sensors. The data 740 stored may be organized as one or more memory registers/addresses, files, and/or databases. The data 740 may include an image stream 742 and sensor data 744. The image stream 742 may include an image or a video from an image capture device. The sensor data 744 may include data from one or more sensors internal or external to the image capture device. The electronic memory 710 may also store an image location object 746 that contains the output of the image mapper. The image location object 746 may include, inter alia:

Image data
Coordinates corresponding to corners of the field of view (and/or coordinates corresponding to respective image locations, pixels, and/or the like)

The one or more processors 712 may include one or more general purpose devices, such as an Intel®, AMD®, or other standard microprocessor. The one or more processors 712 may include a special purpose processing device, such as ASIC, SoC, SiP, FPGA, PAL, PLA, FPLA, PLD, or other customized or programmable device. The one or more processors 712 can perform distributed (e.g., parallel) processing to execute or otherwise implement functionalities of the presently disclosed embodiments. The one or more processors 712 may run a standard operating system and perform standard operating system functions. It is recognized that any standard operating systems may be used, such as, for example, Apple® iOS, Microsoft® Windows®, Apple® MacOS®, Disk Operating System (DOS), UNIX, IRJX, Solaris, SunOS, FreeBSD, Linux®, ffiM® OS/2® operating systems, VxWorks, OS-9, QNX, and so forth.

The network interface 714 may facilitate communication with other computing devices and/or networks, such as the Internet and/or other computing and/or communications networks. The network interface 714 may be equipped with conventional network connectivity. The network interface 714 may be a wireless network interface, equipped with conventional wireless network connectivity technologies. In some embodiments, the network interface 714 may be used to communicate with a current and voltage sensor measuring power consumption of the area in which the image mapper 750 is located.

The I/O interface 716 may facilitate interfacing with one or more input devices and/or one or more output devices.

A system bus 718 may facilitate communication and/or interaction between the other components of the image mapper 750, including the electronic memory 710, the one or more processors 712, the network interface 714, and the I/O interface 716.

As can be appreciated, in other embodiments, the image mapper 750 may be simpler than shown or described. For example, certain designs may forgo one or more components, such as memory, multiple processors, multiple interfaces, and the like, and instead execute instructions closer to or on bare metal (e.g., without an intervening operating system or other software layer, executing instructions directly on logic hardware).

Figure 8:
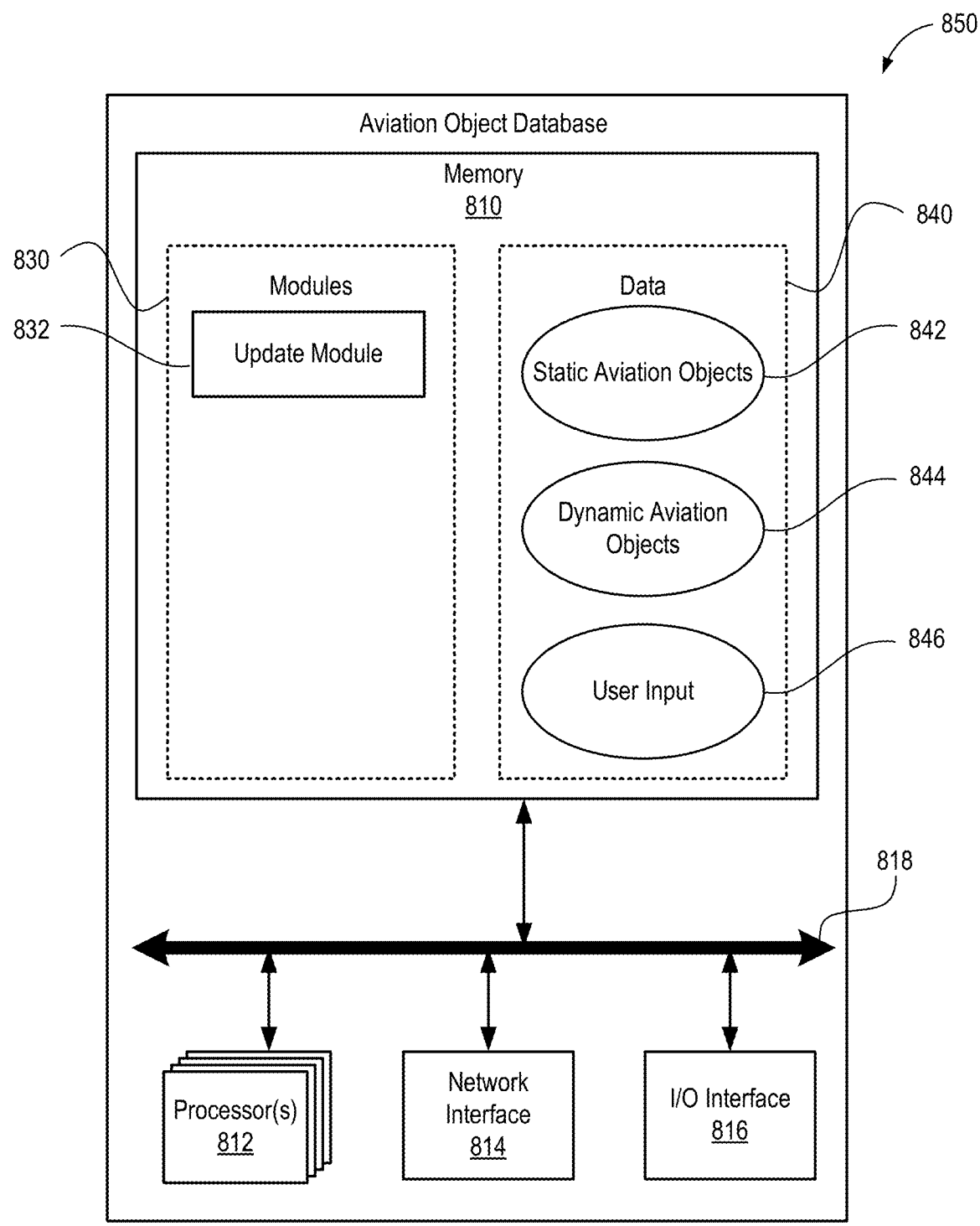
FIG. 8 is a block diagram of an aviation object database, according to one embodiment.

FIG. 8 is a block diagram of an aviation object database 850, according to one embodiment. The aviation object database 850 may include an electronic memory 810, one or more processors 812, a network interface 814, and an I/O interface 816. The electronic memory 810, one or more processors 812, the network interface 814, and the I/O interface 816 may have analogous features to those disclosed with reference to the electronic memory 710, one or more processors 712, the network interface 714, and the I/O interface 716 of FIG. 7.

However, the aviation object database 850 includes different modules 830 and stores a different set of data 840. The modules 830 of the aviation object database 850 may include an update module 832. The update module 832 may periodically check various sources for additional information on aviation objects. In some embodiments, the update module 832 may be pushed information from the sources without the need to check for updated information. The data 840 stored on the electronic memory 810 may include static aviation objects 842, dynamic aviation objects 844, and user input 846.

In some embodiments, the update module 832 may receive static aviation objects 842, dynamic aviation objects 844, and user input 846 and create tags for each received information. The tags identifying location, type and associated information of the aviation objects. The update module 832 may also retrieve an image or a reference to an image representative of the aviation object. The representative image to be overlayed on the image from the ICD. The update module 832 may create and store a tagged static aviation object including, but not limited to:

Identifier
Name
Coordinates
Type (e.g., airport, runway)
Representative image

In some embodiments, the update module 832 may create and store a tagged static aviation object for runways including:

Identifier
Name
Altitude/Elevation
Coordinates for each corner of the runway

The coordinates for the corner of the runways may be used to correctly place an image representative of the runway at a correct orientation.

Figure 9:
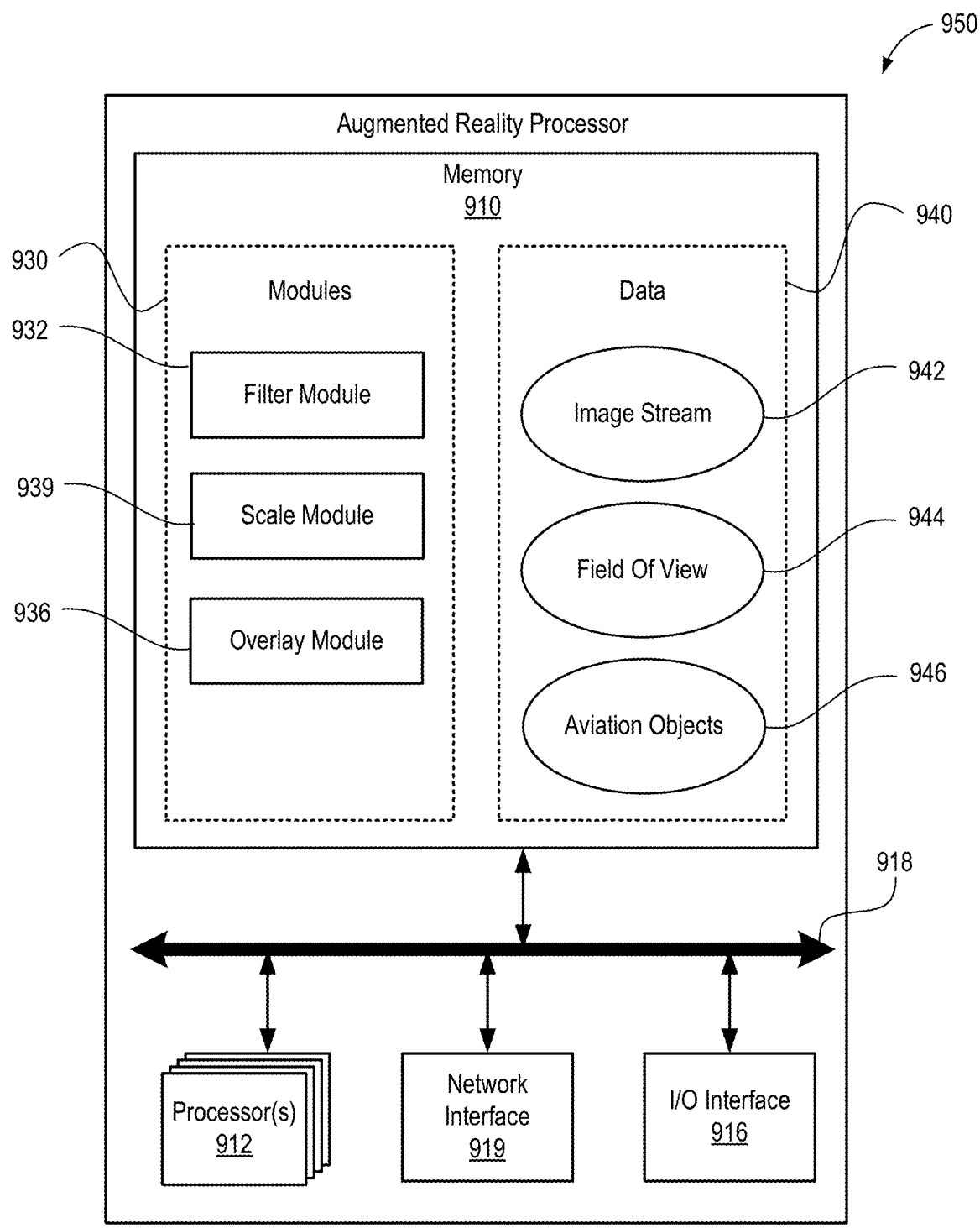
FIG. 9 is a block diagram of an AR processor, according to one embodiment.

The update module 832 may create and store a tagged dynamic aviation object including:

Identifier
Name
Coordinates
Type (e.g., weather, aircraft)
Representative image
Expiration
Altitude
Speed
Direction (heading)
Intensity
Threat-level
Reference to aviation object The coordinates of a tagged dynamic aviation object may be tied to a static aviation object. For example, the dynamic aviation object may be weather at an airport. Thus the update module 832 may simply use the reference to aviation object for the coordinates FIG. 9 is a block diagram of an AR processor 950, according to one embodiment. The AR processor 950 may include an electronic memory 910, one or more processors 912, a network interface 914, and an I/O interface 916. The electronic memory 910, one or more processors 912, the network interface 914, and the I/O interface 916 may have analogous features to those disclosed with reference to the electronic memory 710, one or more processors 712, the network interface 714, and the I/O interface 716 of FIG. 7.

However, the AR processor 950 includes different modules 930 and stores a different set of data 940. The data 940 stored on the electronic memory 910 may be from an aviation object database and an image mapper. The data 940 may include an image stream 942, a field of view 944, and aviation objects 946.

The modules 930 of the AR processor 950 may include a filter module 932 to screen select aviation objects based on the field of view 944 or user settings. The filter module 932 may identify aviation objects within the field of view of image(s) from the image display device. For example, the filter module 932 may correlate the field of view 944 to location-tagged aviation objects by applying location coordinates to the image. Further, the filter module 932 may use the location coordinates of the image to identify aviation objects 946 that fall within the field of view 944.

In some embodiments the filter module 932 may automatically filter aviation objects 946 based on a set of criteria. The criteria may include distance, related dynamic information, terrain, and reachability. For example, the filter module 932 may remove objects beyond a threshold distance. In some embodiments, the filter module 932 may remove aviation objects 946 based on weather conditions—for example, if an airport has high winds and it is not advisable to land at the airport. Additionally, in an emergency situation, such as an "engine out" condition, the filter module 932 may filter aviation objects 946 that are not reachable under current conditions.

In some embodiments, the filter module 932 may filter based on user-defined filtering criteria. The user-defined filtering criteria may include object characteristics such as airport type, size, runway length, and classification. The user-defined filtering criteria may also include user-defined distance threshold(s), fuel prices, and types of services (e.g., food, rental cars, etc.). Filtered objects may either not appear or have less detail than non-filtered items. For example there may be less information for more distant objects.

In some embodiments, the filter module 932 may remove aviation objects from the display based on user activity. For example, if the user selects an airport only information for that airport may be displayed and other information filtered out.

The modules 930 of the AR processor 950 may also include a scale module 934 to appropriately size graphical elements representing aviation objects 946. The scale module 934 may scale or otherwise differentiate elements based on distance. The scale module 934 may also ensure that the graphical elements do not obscure other map information.

The modules 930 of the AR processor 950 may also include an overlay module 936 to create graphical user interface elements for aviation objects 946 within the field of view 944 and overlay the graphical user interface elements on the image stream 942. The graphical user interface elements may include object information airport diagram(s), communication information, etc. The graphical user interface elements may also include dynamic information such as weather conditions.

The graphical user interface may show information regarding orientation relative to the runway. For example, the graphical user interface element may be oriented based on the aircraft orientation. In some embodiments, the graphical user interface element may include a rectangle that overlays a runway to show location/orientation of the runway. The option to overlay a graphical user interface on the runway may only be available when the aircraft is sufficiently close and has sufficiently accurate position/orientation data. For example, if an image capture device is locked in location as the aircraft is approaching a runway, the overlay module 936 may place a rectangular element on the runway.

The overlay module 936 may position elements per elevation. For example, using elevation information from the aviation objects 946 and the current elevation of the aircraft, the overlay module 936 may show markers at the correct "height" on the image stream 942.

The overlay module 936 may use different elements to show different types of aviation objects. For example different elements may be used for different types of airports. In some embodiments elements may be used per the severity of weather conditions (e.g., display as volume, surface, etc.). Elements may also be different per proximity to restricted airspace (e.g., display as volume, surface, etc.), or per proximity of other air traffic (e.g., display heading/speed vectors).

In some embodiments, the overlay module 936 may create an element representative of user-defined aviation objects. For example, the overlay module 936 may create a flight path line with a line or a series of boxes or hoops. Additionally, the overlay module 936 may create and place a warning on the image stream 942 if the aircraft is deviating from the flight path line by more than a threshold amount. In some embodiments, the overlay module 936 may even augment the image stream 942 with elements to assist in returning an aircraft to the flight path line.

The overlay module 936 may search coordinates within the field of view store in an image location object for aviation objects, the image location object including:
Image data
Coordinates corresponding to corners of the field of view
The overlay module 936 compare tagged aviation objects coordinates to the coordinates of the field of view, where an aviation object database stores tagged static aviation object including:
Identifier
Name
Coordinates
Type (e.g., airport, runway)
Representative image If the coordinates of a tagged aviation object is within the coordinates of the field of view, the overlay module 936 may overlay the representative image of the aviation object onto the image from the image capture device.

The AR processor 950 may output an augmented image stream to an image display device through the I/O interface 916 or the network interface 914. The image display device may show the image stream 942 overlaid with the graphical user interface elements.

Figure 10:
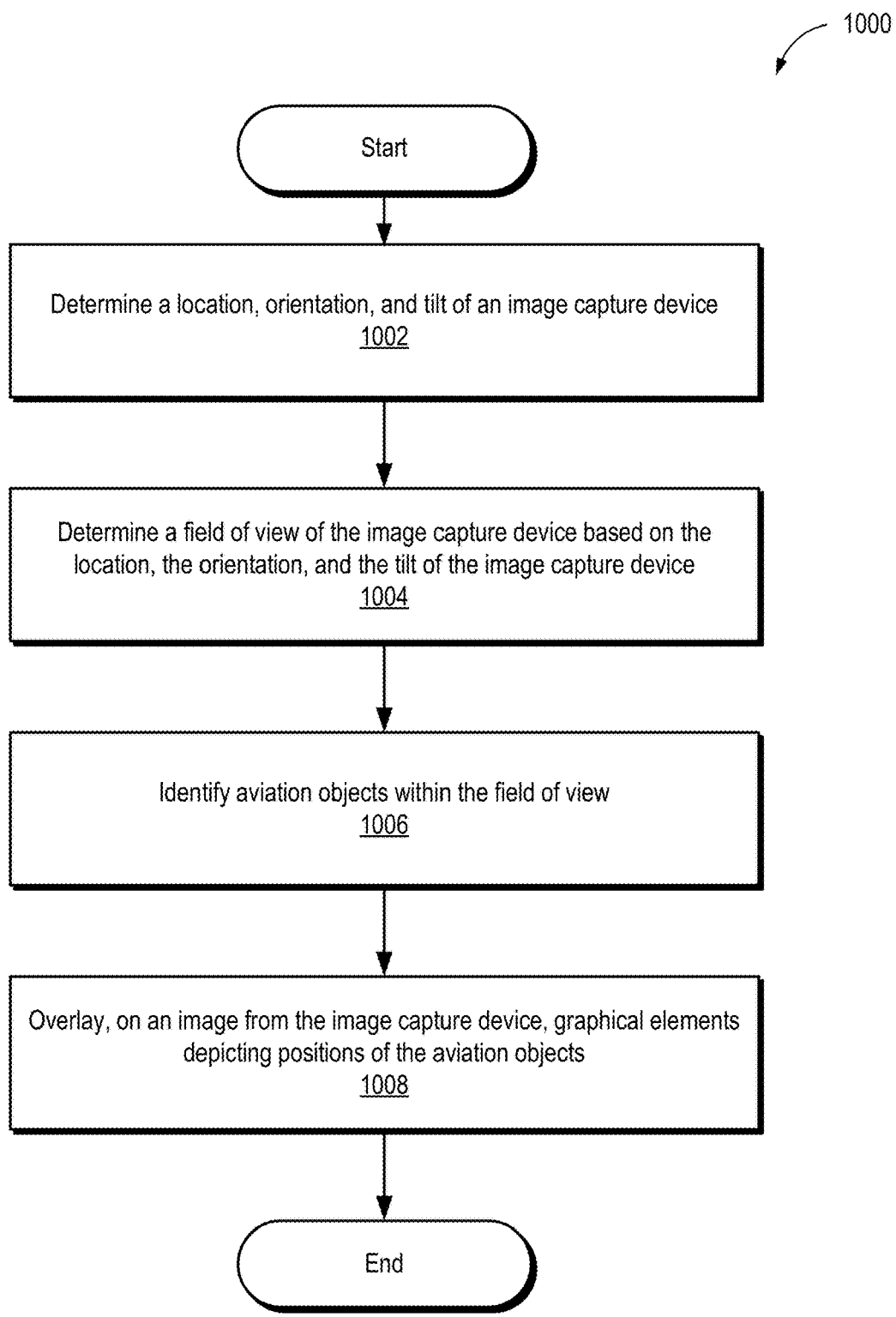
FIG. 10 is a flow diagram of a method for producing an AR aviation interface.

FIG. 10 is a flow diagram of a method 1000 for producing an AR aviation interface. The method includes determining 1002 a location, orientation, and tilt of an image capture device. Determining 1002 the orientation may involve receiving data from sensors associated with the image capture device. For example, an AR system may receive global positioning data from a sensor of the image capture device or an external sensor to determine a location of and to track the image capture device, may receive compass data from the image capture device to determine a lateral angle of the image capture device, and may receive accelerometer or gyroscope data from the image capture device to determine a vertical angle of the image capture device.

In some embodiments the method 1000 may include calibrating the sensor data. Calibration may be done by determining a first vector quantifying a velocity and a direction of travel based on the global positioning data. Additionally, a second vector may be determined quantifying a velocity and heading of an aircraft associated with the image capture device. A wind error may be determined by finding the difference between the first vector and the second vector. Further, the image capture device may be positioned to a determined orientation within the aircraft, and a compass error may be determined by finding a difference between the lateral angle received from the image capture device and the heading of the aircraft. The lateral angle from the sensor data may be corrected by accounting for the wind error and the compass error.

The method 1000 further includes determining 1004 a field of view of the image capture device based on the location, the orientation, and the tilt of the image capture device. This may be based additionally on image capture device sensor and lens properties. The method 1000 also includes identifying 1006 aviation objects within the field of view, and overlaying 1008, on an image from the image capture device, graphical elements depicting positions of the aviation objects.

Figure 11:
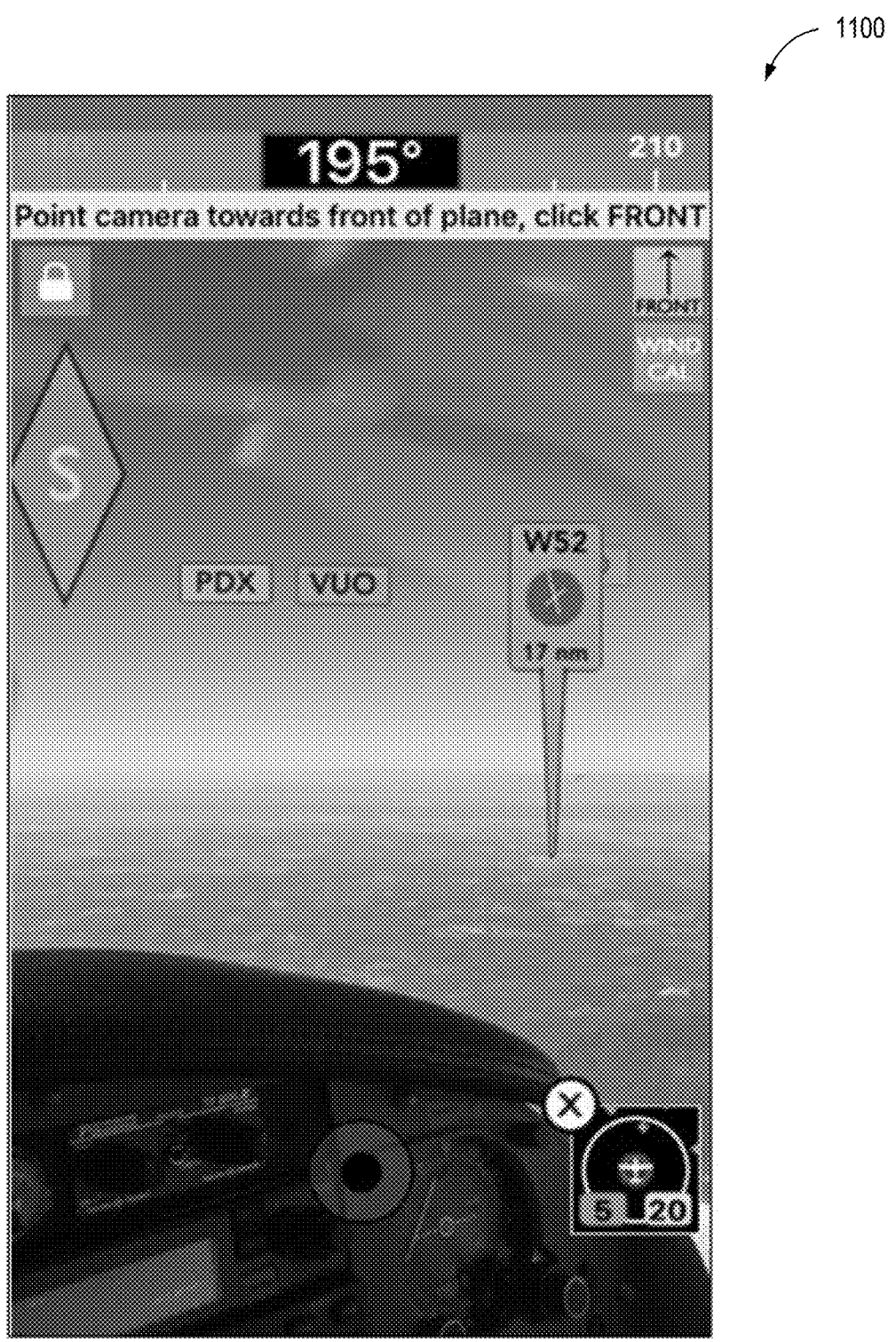
FIG. 11 illustrates one embodiment of an AR aviation interface.

FIG. 11 illustrates one embodiment of an AR aviation interface 1100. As shown, the AR aviation interface may show information related to aviation objects within the field of view.

Figure 12:
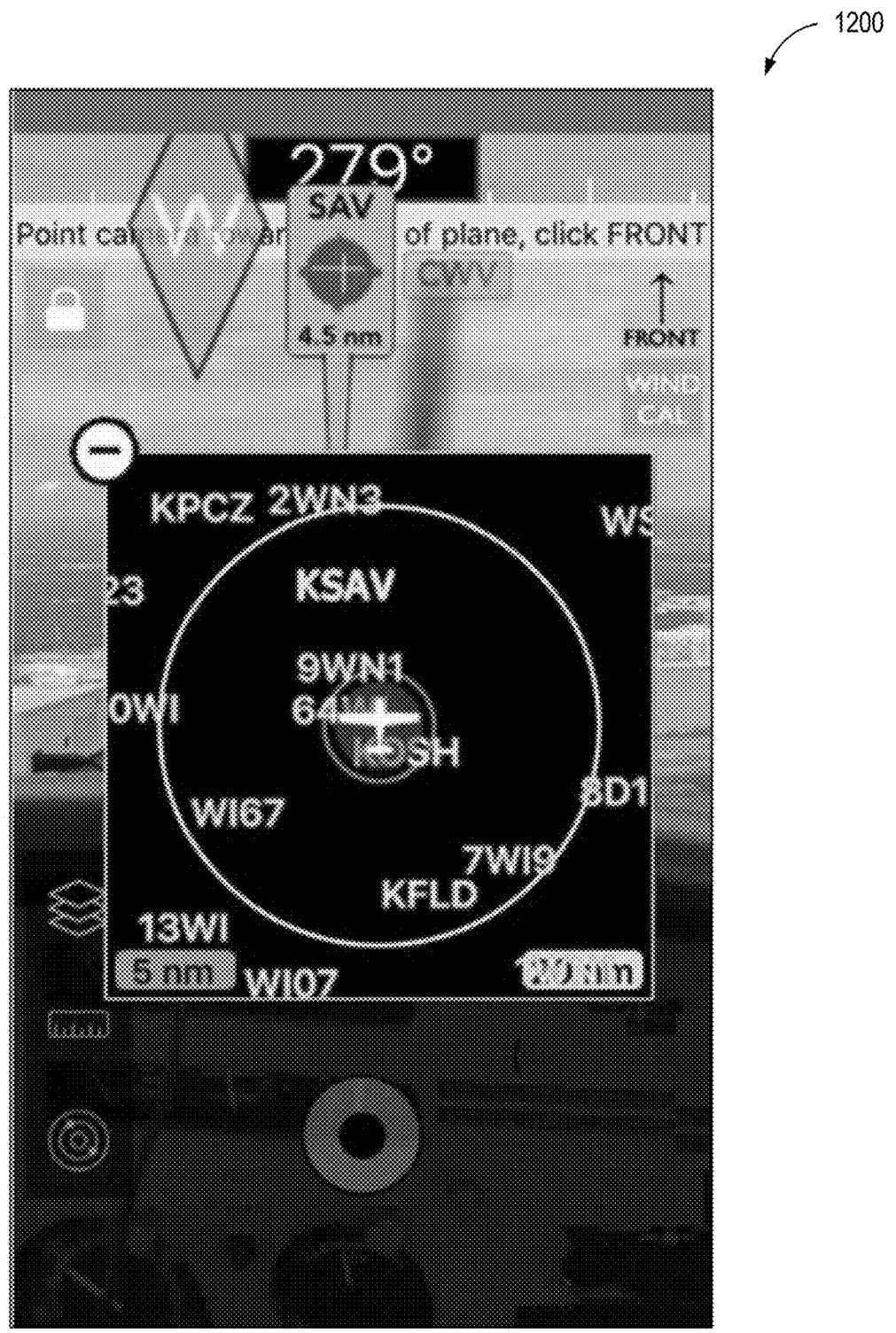
FIG. 12 illustrates an AR aviation interface displaying additional detailed information based on user input according to one embodiment.

FIG. 12 illustrates an AR aviation interface 1200 displaying additional detailed information based on user input according to one embodiment. A user may select aviation objects on the AR aviation interface 1200 and a larger dialogue box may appear with additional information.

Figure 13:
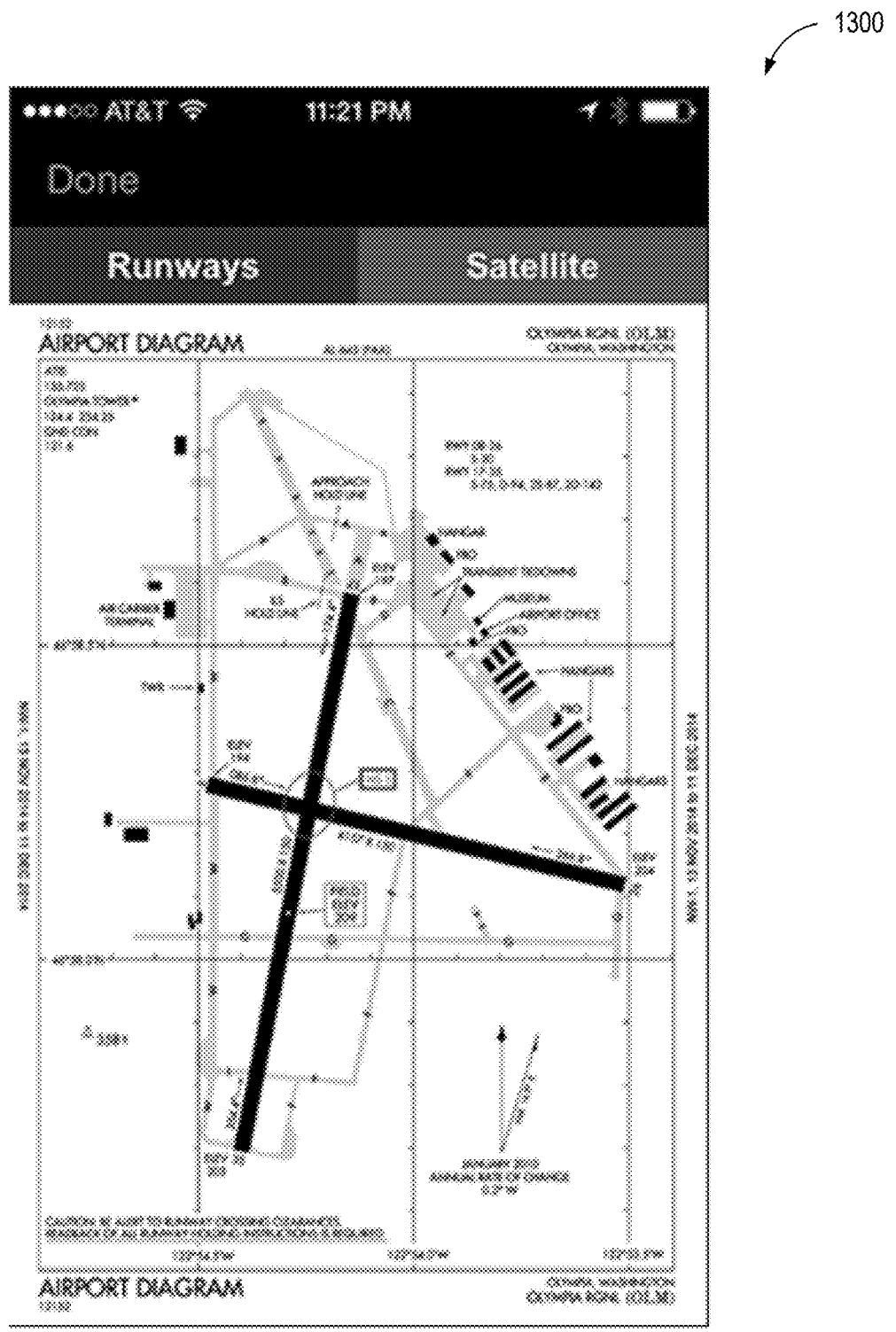
FIG. 13 illustrates an AR aviation interface displaying additional detailed information based on user input according to another embodiment.

FIG. 13 illustrates an AR aviation interface 1300 displaying additional detailed information based on user input according to another embodiment. As shown, in some embodiments, the AR aviation interface 1300 may display a schematic or satellite image of an aviation object of interest such as a runway. In some embodiments, if a user selects an aviation object the AR aviation interface 1300 stops displaying an AR image and provides a full screen view of detailed information about the selected aviation object.

Figure 14:
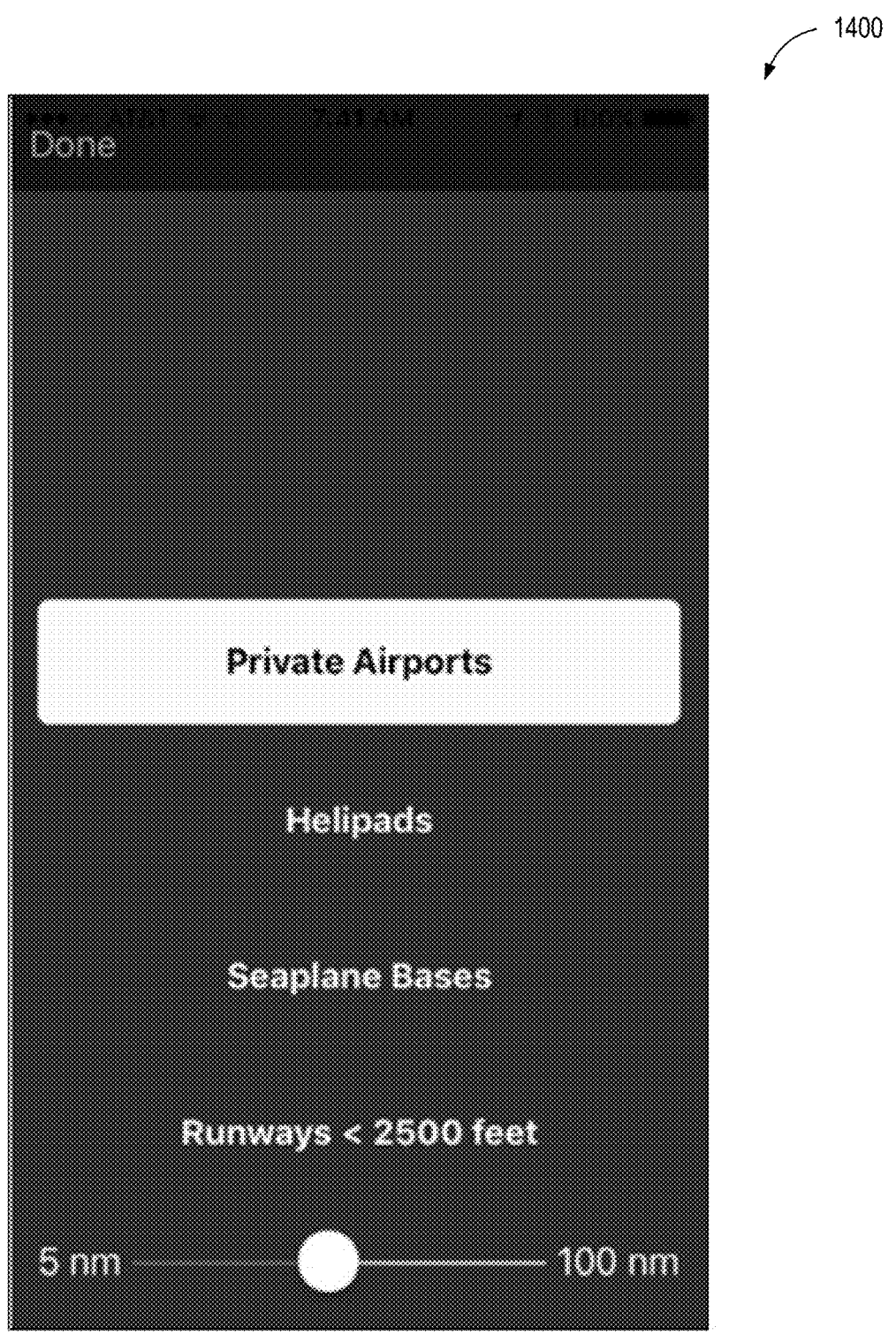
FIG. 14 illustrates an AR aviation interface for filtering.

FIG. 14 illustrates an AR aviation interface 1400 for filtering. As shown, the filters may be based on airport types, aircraft type, or distance.

Figure 15:
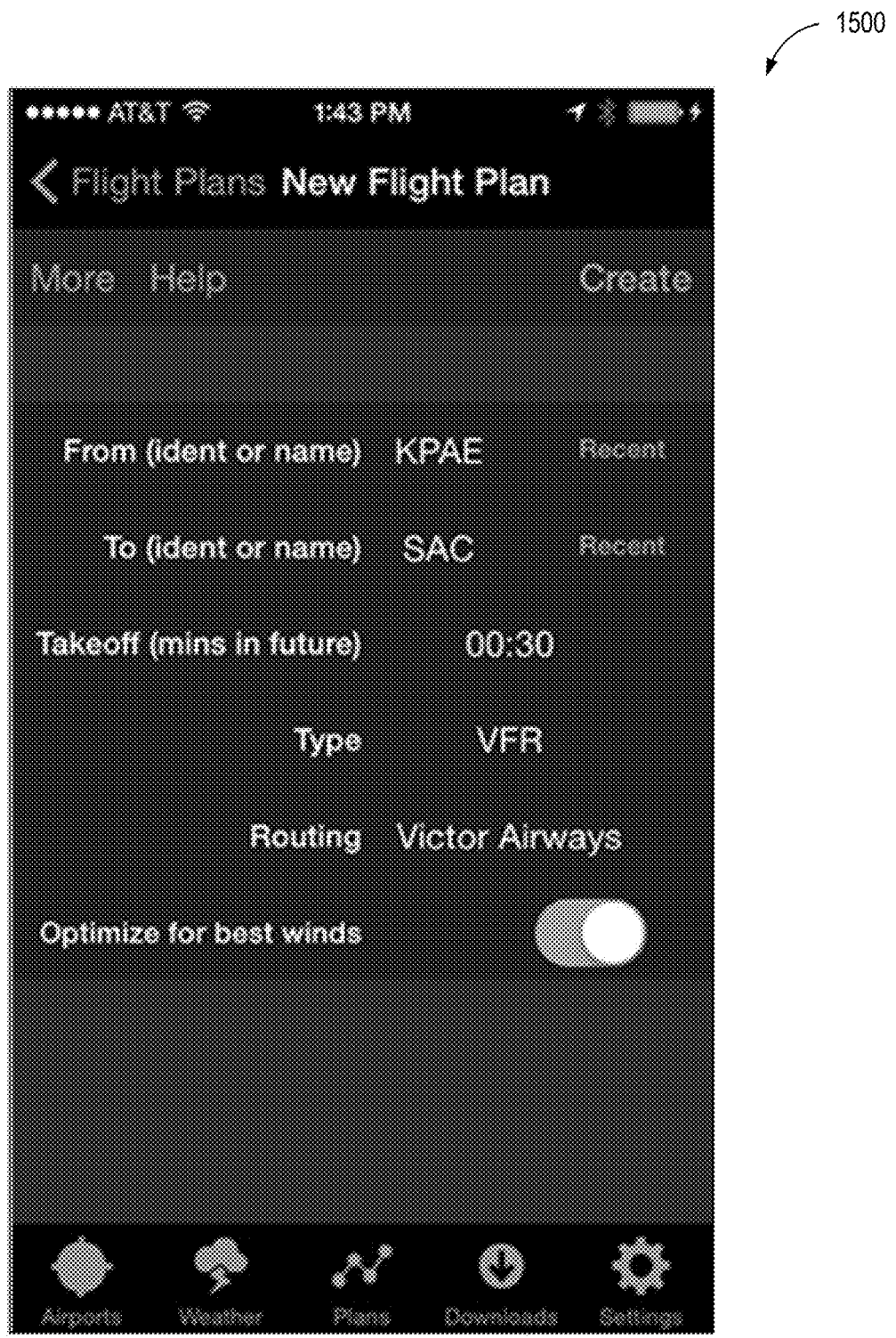
FIG. 15 illustrates an AR aviation interface for filtering for entering a flight plan.

FIG. 15 illustrates an AR aviation interface 1500 for filtering for entering a flight plan. Using the AR aviation interface 1500, a pilot may enter information about a new flight.

Figure 16:
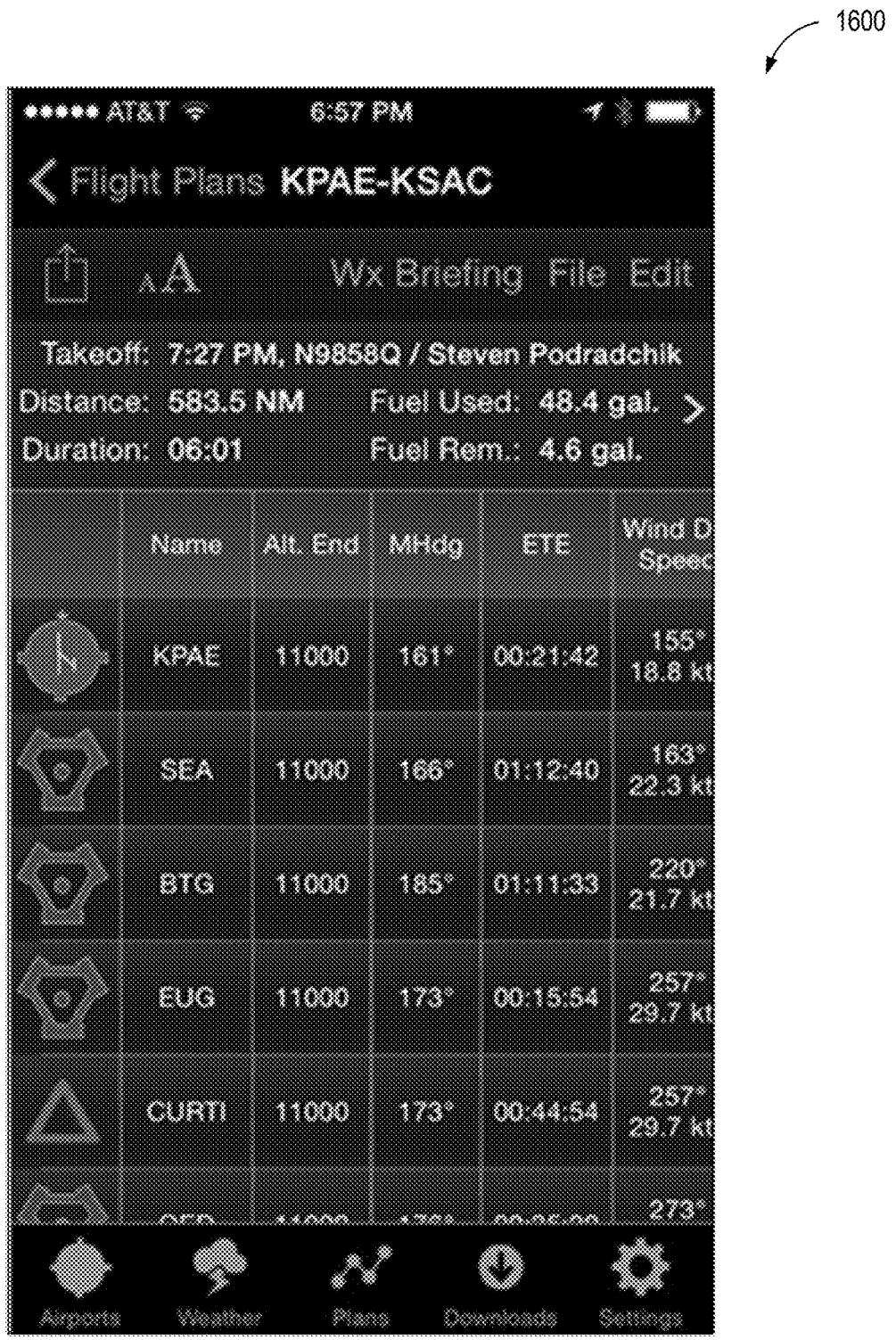
FIG. 16 illustrates an AR aviation interface for filtering for viewing a flight plan.

FIG. 16 illustrates an AR aviation interface 1600 for filtering for viewing a flight plan. Using the AR aviation interface 1600, a pilot may view information about a new flight.

In the disclosure, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical character recognition systems, server computers, and/or communications networks have not been shown or described in detail to avoid unnecessarily obscuring descriptions of the embodiments.

Changes may be made to the details of the above-described embodiments without departing from the underlying principles of the invention. The scope of the present invention should, therefore, be determined only by the following claims.

We claim:

1. An augmented reality apparatus for aviation, comprising:
   a video interface implemented by logic hardware to receive image data from an image capture device collocated with an aircraft;
   a sensor interface configured to receive first sensor data pertaining to a geographical location of the aircraft and second sensor data pertaining to an orientation of the image capture device;
   a memory configured to store aviation object information configured to associate aviation objects with respective geographical locations; and
   a processing unit configured to:
      determine a geographical location of the aircraft based on the first sensor data, determine an orientation of the image capture device based on the second sensor data, determine a field of view of the image capture device based on the determined geographical location of the aircraft and the determined orientation of the image capture device, the field of view comprising a geographical area external to the aircraft;

identify aviation objects having geographical locations within the external geographical area of the determined field of view; and generate graphical user interface elements corresponding to one or more of the identified aviation objects to be overlaid on the image data;

wherein:

the processing unit is further configured to determine a heading compensation factor for the aircraft, the heading compensation factor based on an error between an aircraft vector and a ground vector of the aircraft; and determining the orientation of the image capture device comprises the processing unit applying the heading compensation factor to the second sensor data.

2. The apparatus of claim 1, wherein the image capture device is physically coupled to the aircraft.

3. The apparatus of claim 1, further comprising a display to show the graphical user interface elements overlaid on the image data.

4. The apparatus of claim 1, wherein the image capture device comprises a mobile device disposed within the aircraft.

5. The apparatus of claim 1, wherein the sensor interface receives one or more of the first sensor data and the second sensor data from the image capture device.

6. The apparatus of claim 1, wherein the sensor interface receives the first sensor data from one or more of an avionic sensor, an external global positioning system (GPS), an Automatic Dependent Surveillance-Broadcast (ADS-B) receiver, and an Attitude Heading Reference System (AHRS).

7. The apparatus of claim 1, wherein:

the aviation objects comprise one or more of airports, runways, airspace, airways, navaids, fixes, obstacles, flight courses, weather conditions, air traffic, and temporary airspace restrictions; and aviation object information pertaining to one or more of the aviation objects is received from an Automatic Dependent Surveillance-Broadcast receiver.

8. A non-transitory computer-readable storage medium that stores machine-readable instructions that, when executed by one or more processors, cause the one or more processors to perform operations, comprising:

acquiring an image from an image capture device collocated with an aircraft;

determining a geographical location of the aircraft;

determining an orientation of the image capture device;

determining an area outside of the aircraft captured in the acquired image, comprising determining a field of view of the image capture device based on the determined geographical location of the aircraft and the determined orientation of the image capture device;

identifying aviation objects within the determined area outside of the aircraft captured in the acquired image;

overlaying graphical user interface elements depicting one or more of the identified aviation objects on the captured image; and determining a compass error of the image capture device, the compass error quantifying a difference between first heading data acquired by a compass of the image capture device while the image capture device is maintained at a designated orientation within the aircraft and second heading data corresponding to a determined track of the aircraft, wherein determining the orientation of the image capture device comprises applying the compass error to heading data acquired by the compass of the image capture device.

9. The non-transitory computer-readable storage medium of claim 8, wherein:

the aviation object data includes an elevation for each aviation object; and overlaying a graphical user interface element depicting a first aviation object comprises determining a vertical coordinate for the graphical user interface element based on an elevation of the first aviation object and the determined field of view.

10. The non-transitory computer-readable storage medium of claim 8, the operations further comprising one or more of filtering aviation objects based on distance from the image capture device and scaling the graphical user interface elements based on distance.

11. The non-transitory computer-readable storage medium of claim 8, wherein:

the aviation object data includes an orientation of a runway, and overlaying the graphical user interface elements comprises orienting a graphical user interface element representative of the runway based on the orientation of the runway and the determined field of view.

12. The non-transitory computer-readable storage medium of claim 8, wherein:

the aviation object data comprises a flight plan, and overlaying the graphical user interface elements comprises overlaying a graphical user interface element configured to represent the flight plan on the captured image.

13. A method, comprising:

determining a geographical location of an aircraft;

determining an orientation and tilt of an image capture device collocated with the aircraft wherein the determining the orientation and tilt of the image capture device comprises:

receiving global positioning data from one or more of a sensor of the image capture device and an external sensor;

tracking a location of the image capture device by use of the global positioning data;

determining a lateral angle of the image capture device by use of compass data acquired from the image capture device, wherein determining the lateral angle of the image capture device comprises calibrating the compass data by determining a first vector quantifying a velocity and a direction of travel based on the global positioning data, determining a second vector quantifying a velocity and heading of the aircraft, calculating a wind error by finding a difference between the first vector and the second vector, and correcting the lateral angle by accounting for the calculated wind error; and determining a vertical angle of the image capture device by use of one or more of accelerometer data and gyroscope data acquired from the image capture device;

determining a geographical area captured in an image acquired by the image capture device, comprising determining a field of view of the image capture device based on the determined geographical location of the aircraft and the determined orientation and tilt of the image capture device;

identifying aviation objects within the determined geographical area captured in the image; and overlaying graphical elements depicting positions of one or more of the identified aviation objects on the image acquired by the image capture device.

14. The method of claim 13, further comprising:

positioning the image capture device at a determined orientation within the aircraft; and determining a compass error by finding a difference between the lateral angle received from the image capture device and the heading of the aircraft, wherein correcting the lateral angle further comprises accounting for the determined compass error.

15. The method of claim 13, further comprising prompting a user to recalibrate in response to one or more of:

detecting drift in the compass data from the image capture device;

reaching a threshold distance; and a threshold period of time.

16. The method of claim 13, further comprising suppressing one or more of the compass data, the accelerometer data, and the gyroscope data during an aircraft turn.

17. The method of claim 13, wherein one or more of the compass data, accelerometer data, and the gyroscope data are subject to a first type of perturbation, and wherein the method further comprises one or more of:

suppressing the compass data in response to the compass data deviating from other sensor data not susceptible to the first type of perturbation;

suppressing the accelerometer data in response to the accelerometer data deviating from the other sensor data; and suppressing the gyroscope data in response to the gyroscope data deviating from the other sensor data.

18. The method of claim 13, wherein the orientation of the image capture device is fixed relative to an aircraft.

19. The method of claim 13, wherein a lateral angle of the image capture device is fixed relative to an aircraft.

* * * * *